(12) United States Patent
Flockenhaus et al.

(10) Patent No.: US 10,578,475 B2
(45) Date of Patent: Mar. 3, 2020

(54) SENSING DEVICES AND SYSTEMS INCLUDING EXAMPLES OF PAIRING SENSING DEVICES TO CONTAINERS

(71) Applicant: Beverage Intel, LLC, Indianapolis, IN (US)

(72) Inventors: Michael Flockenhaus, Fishers, IN (US); Jason Franklin Austin, Raleigh, NC (US)

(73) Assignee: Beverage Intel, LLC, Indianapolis, IN (US)

( * ) Notice: Subject to any disclaimer, the term of this patent is extended or adjusted under 35 U.S.C. 154(b) by 324 days.

(21) Appl. No.: 15/142,942

(22) Filed: Apr. 29, 2016

(65) Prior Publication Data

US 2017/0314981 A1    Nov. 2, 2017

(51) Int. Cl.
*G01F 23/20* (2006.01)
*G06Q 10/08* (2012.01)
*G06Q 50/12* (2012.01)

(52) U.S. Cl.
CPC .......... *G01F 23/20* (2013.01); *G06Q 10/087* (2013.01); *G06Q 50/12* (2013.01)

(58) Field of Classification Search
CPC ...... G01F 23/20; G01F 23/205; G06Q 10/087
See application file for complete search history.

(56) References Cited

U.S. PATENT DOCUMENTS

| 327,604 | A |  | 8/1885  | Shantz |
| 331,349 | A |  | 12/1885 | Von Rom |
| 4,869,396 | A |  | 9/1989  | Horino et al. |
| 4,947,123 | A |  | 8/1990  | Minezawa |
| 4,979,641 | A |  | 12/1990 | Turner |
| 4,997,012 | A |  | 3/1991  | Kuziw |
| 5,022,557 | A |  | 6/1991  | Turner |
| D327,604 | S |  | 7/1992  | Culverson |
| D331,349 | S |  | 12/1992 | Culverson |
| 5,603,430 | A | * | 2/1997 | Loehrke ............... B67D 1/0888 222/1 |

(Continued)

FOREIGN PATENT DOCUMENTS

| CN | 1867495 A | 11/2006 |
| CN | 2893668 Y | 4/2007 |

(Continued)

OTHER PUBLICATIONS

First Office Action, CA Application No. 2,928,939 dated Apr. 6, 2017, pp. all.

(Continued)

*Primary Examiner* — Michele Fan
(74) *Attorney, Agent, or Firm* — John V. Daniluck; Bingham Greenbaum Doll LLP

(57) ABSTRACT

Examples of systems and methods are described herein including sensing devices and pairing sensing devices to containers. In some examples, sensing devices may be used to weigh liquid-containing containers. Responsive to changes in weight readings indicative of a change in a container being weighed by a sensing device, a user may be prompted on a user device to associate updated container size and contents with the sensing device. Systems and methods described herein may facilitate accurate inventory management and menu display of liquid available in containers.

22 Claims, 15 Drawing Sheets

(56) References Cited

U.S. PATENT DOCUMENTS

| | | | |
|---|---|---|---|
| 5,614,278 | A | 3/1997 | Chamberlain et al. |
| 5,986,219 | A | 11/1999 | Carroll et al. |
| 6,036,055 | A | 3/2000 | Mogadam et al. |
| 6,546,795 | B1 | 4/2003 | Dietz |
| 6,580,357 | B1 | 6/2003 | Forster et al. |
| 6,847,912 | B2 | 1/2005 | Forster |
| 6,938,488 | B2 | 9/2005 | Diaz et al. |
| 7,107,836 | B2 | 9/2006 | Brookner |
| 7,255,003 | B2 | 8/2007 | Schneiter |
| 7,458,260 | B2 | 12/2008 | Roesner |
| 7,471,208 | B1 | 12/2008 | Hoben et al. |
| 7,565,240 | B2 | 7/2009 | Tomizawa |
| 7,814,786 | B2 | 10/2010 | Woodard |
| 7,821,410 | B2* | 10/2010 | Higashionji ............... B41J 3/44 340/572.1 |
| 7,855,637 | B2 | 12/2010 | Forster |
| 8,115,610 | B2 | 2/2012 | Lionetti et al. |
| 8,241,918 | B2 | 8/2012 | Bertram et al. |
| 8,363,618 | B2 | 1/2013 | Callahan et al. |
| 8,880,427 | B1 | 11/2014 | Jones |
| 9,221,667 | B2 | 12/2015 | Hershberger et al. |
| 9,481,559 | B2 | 11/2016 | Hershberger et al. |
| 9,485,549 | B2 | 11/2016 | Hershberger et al. |
| 9,617,140 | B2 | 4/2017 | Mayer et al. |
| 9,736,554 | B2 | 8/2017 | Hershberger et al. |
| 2002/0070861 | A1* | 6/2002 | Teller ................... B67D 1/1405 340/572.1 |
| 2003/0034392 | A1* | 2/2003 | Grimm ............... G06K 7/10881 235/385 |
| 2003/0146847 | A1 | 8/2003 | Swetlik et al. |
| 2003/0172745 | A1 | 9/2003 | Mitchinson |
| 2005/0000737 | A1 | 1/2005 | Fox et al. |
| 2005/0120793 | A1 | 6/2005 | Cochran, Jr. et al. |
| 2005/0194399 | A1 | 9/2005 | Proctor |
| 2005/0197738 | A1* | 9/2005 | Morrison ................. G01C 9/00 700/231 |
| 2005/0275547 | A1 | 12/2005 | Kates |
| 2006/0000277 | A1* | 1/2006 | Pietrorazio ............. G01F 22/00 73/293 |
| 2006/0038684 | A1* | 2/2006 | Lahiri .................... B65D 79/02 340/572.1 |
| 2006/0238346 | A1* | 10/2006 | Teller ................... B67D 3/0077 340/572.1 |
| 2007/0056368 | A1* | 3/2007 | Schneiter ................ G01F 23/20 73/296 |
| 2007/0088681 | A1 | 4/2007 | Aravamudan et al. |
| 2007/0107801 | A1* | 5/2007 | Cochran ................... B65B 3/36 141/153 |
| 2007/0215239 | A1 | 9/2007 | Dorney |
| 2008/0157967 | A1* | 7/2008 | Jones ..................... G01G 15/00 340/572.1 |
| 2009/0114675 | A1* | 5/2009 | Kuzar ................... B67D 3/0006 222/40 |
| 2009/0261981 | A1* | 10/2009 | Jones ..................... G06Q 10/06 340/666 |
| 2009/0322488 | A1 | 12/2009 | Kanagala et al. |
| 2010/0147894 | A1 | 3/2010 | Reimann et al. |
| 2010/0089943 | A1 | 4/2010 | Till |
| 2010/0125362 | A1 | 5/2010 | Canora et al. |
| 2010/0226100 | A1 | 9/2010 | Johnson et al. |
| 2011/0012731 | A1 | 1/2011 | Stevens |
| 2011/0029255 | A1* | 2/2011 | Hyde .................. A47G 19/2227 702/25 |
| 2011/0050431 | A1* | 3/2011 | Hood .................. A47G 19/2227 340/603 |
| 2011/0163850 | A1 | 7/2011 | Bachman et al. |
| 2011/0166699 | A1* | 7/2011 | Palmquist ............ B67D 1/1234 700/236 |
| 2012/0019398 | A1 | 1/2012 | Vogt et al. |
| 2012/0059513 | A1* | 3/2012 | Perkins ................ B67D 1/0406 700/244 |
| 2012/0189762 | A1 | 7/2012 | Reineccius et al. |
| 2012/0269150 | A1 | 10/2012 | Delorme et al. |
| 2013/0048668 | A1 | 2/2013 | Osborne |
| 2013/0314209 | A1* | 11/2013 | Zogg .................... B41J 2/17546 340/5.65 |
| 2013/0314244 | A1* | 11/2013 | Hershberger .......... G01D 4/002 340/870.02 |
| 2014/0166374 | A1 | 6/2014 | Deng et al. |
| 2014/0324585 | A1* | 10/2014 | Mederos ............ G06Q 30/0257 705/14.55 |
| 2014/0372505 | A1 | 12/2014 | Robinson et al. |
| 2015/0109143 | A1* | 4/2015 | Hershberger .......... G06Q 10/08 340/870.07 |
| 2016/0159633 | A1* | 6/2016 | Diffenderfer ........ B67D 3/0006 222/23 |
| 2016/0162831 | A1 | 6/2016 | Hershberger et al. |
| 2016/0198246 | A1* | 7/2016 | Gurumohan ............. H04Q 9/00 340/870.02 |
| 2016/0264394 | A1 | 9/2016 | Hershberger et al. |
| 2017/0184443 | A1 | 6/2017 | Hershberger et al. |
| 2018/0023765 | A1* | 1/2018 | Sweeney ................. F17C 13/02 235/492 |

FOREIGN PATENT DOCUMENTS

| | | | |
|---|---|---|---|
| CN | 201043914 | | 4/2008 |
| CN | 201335732 | | 10/2009 |
| CN | 101850876 | A | 10/2010 |
| CN | 101901536 | A | 12/2010 |
| CN | 201686168 | U | 12/2010 |
| CN | 201724716 | | 1/2011 |
| CN | 201837448 | | 5/2011 |
| CN | 202057402 | | 11/2011 |
| CN | 102700840 | A | 10/2012 |
| CN | 202720033 | U | 2/2013 |
| JP | 2001229466 | A * | 8/2001 |
| WO | 03101022 | A2 | 12/2003 |
| WO | 2003101022 | A3 | 12/2003 |
| WO | 2006009841 | | 1/2006 |
| WO | 2008004144 | A2 | 1/2008 |
| WO | 2013189207 | | 12/2013 |
| WO | WO 2015066594 | A1 * | 5/2015 ........... B67D 1/0801 |

OTHER PUBLICATIONS

Antti Ruhanen et al., "Building Radio Frequency Identification for the Global Environment Sensor-enabled RFID Tag Handbook" dated Jan. 15, 2008; pp. all.

Rotunno, Tom, "http://www.cnbc.com/2015/10/05/out-of-beer-bud-lights-smart-fridge-will-tell-you.html", CNBC, downloaded Oct. 5, 2015, Oct. 5, 2015, pp. all.

Second Office Action for CA Application No. 2928939, dated Mar. 5, 2018; pp. all.

\* cited by examiner

| Centerville TAVERN | | | | | | | | |
|---|---|---|---|---|---|---|---|---|
| DASHER'S ENVY (XMAS)<br>Moon Dog<br>8% Belg.Ale IBU 25 | 10oz<br>$3 | 16oz<br>$5 | 22oz<br>$100 | FULL CIRCLE<br>New Holland<br>4.9% Kölsch IBU 26 | | | 12oz<br>$4 | |
| FUZZY KNUCKLES<br>Defiance<br>8.6% British Imperial Stout | | 12oz<br>$4.5 | 22oz<br>$6.5 | GOLDEN SABBATH<br>Big Island Brewhaus<br>8.5% Belg. Pale Strong IBU 30 | 10oz<br>$4 | 12oz<br>$5 | 22oz<br>$7 | |
| GRAPEFRUIT JUNGLE<br>Sun King<br>7.5% Amer. IPA IBU 77 | | 16oz<br>$6.5 | 22oz<br>$8 | GREEN TRAIL<br>Ithaca<br>6% Amer. IPA | 10oz<br>$3 | 12oz<br>$4 | 22oz<br>$6 | |
| HAPA ALE<br>Hawaii Nui<br>6.4% Amer. Brown IBU 35 | | 16oz<br>$5 | 22oz<br>$16.5 | HAPPY AMBER<br>MadTree<br>6% Amber IBU 30 | | 16oz<br>$5 | 22oz<br>$8 | |
| HAPPY ENDING (2014)<br>SweetWater<br>9% Amer. Imperial Stout | 12oz<br>$4 | 16oz<br>$5.5 | 22oz<br>$7.5 | HARPOON BLACK IPA<br>Harpoon<br>Black Ale | | 16oz<br>$4.75 | 22oz<br>$6 | |

FIG. 15

SENSING DEVICES AND SYSTEMS INCLUDING EXAMPLES OF PAIRING SENSING DEVICES TO CONTAINERS

TECHNICAL FIELD

Examples described herein include examples of sensing devices which may obtain a weight of an associated container and transmit the weight to a computing system. Examples of pairing the sensing device to a container, e.g. a keg, are described which may take place using a software application, such as a software application on a mobile communication device.

BACKGROUND

Establishments such as restaurants and bars frequently receive products consumed by customers, such as beverages, from distributors. When an establishment runs low on certain products, the establishment typically contacts the distributor to resupply the establishment's stock of products. However, this process can be time consuming, especially when it is difficult for the establishment to ascertain the quantity of certain products, such as when those products are supplied in bulk, such as in kegs.

Moreover, establishments such as restaurants may change their product offerings from time to time, such as by changing available brew types. It may be time consuming to keep updated menus available for consumers.

BRIEF DESCRIPTION OF THE DRAWINGS

FIG. 15 is a display image of a digital display of a menu arranged in accordance with examples described herein.

DETAILED DESCRIPTION

Figure 1:
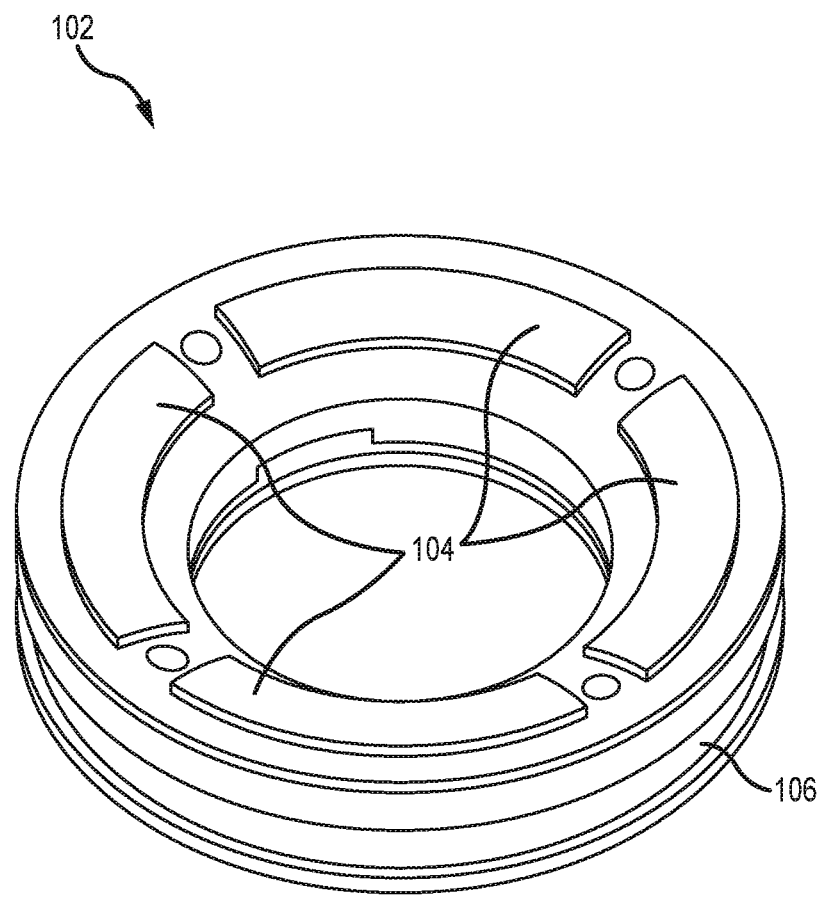
FIG. 1 is a schematic illustration of a sensing device arranged in accordance with examples described herein.

Certain details are set forth below to provide a sufficient understanding of embodiments of the invention. However, it will be clear to one skilled in the art that embodiments of the invention may be practiced without various of these particular details. In some instances, well-known beverage industry components, circuits, control signals, timing protocols, computing system components, and software operations have not been shown in detail in order to avoid unnecessarily obscuring the described embodiments of the invention.

Examples described herein include systems and methods which include sensing devices positioned under containers. The sensing devices may detect a weight of the container and transmit that weight to a computing system. In this manner, amounts of liquid remaining in the containers may be monitored remotely using the sensing devices. In some examples, a container positioned above a particular sensing device may be changed (e.g. when the container is depleted, a new container may be placed on the sensing device). The new container may or may not be the same size as the previous container, and the new container may or may not have the same type of contents as the previous container. In some examples described herein, a user may be notified that the sensing device should be paired with the new container placed on the sensing device. The pairing process may associate the sensing device with a size of the container and contents of the container placed on the sensing device. In some examples, a user may utilize a mobile communication device to associate the sensing device with the size and contents of the new container.

Examples described herein include systems and methods for displaying inventory information. In some examples, sensing devices may be positioned under containers. The sensing devices may detect weights of each of the containers, and transmit the weights to one or more computing systems. Based on the weights, and in some examples further based on a size of the container, a relative fullness of each container may be determined. The available liquids (e.g. beers) may be displayed on a digital display. In some examples, some or all of the available liquids may be displayed together with one or more icons indicative of the size or type of container from which they may be provided, and/or the relative fullness of those containers. Other information relating to the available liquids, e.g. the price and/or age, may also be provided.

In some examples, a sensing device may be associated with a particular size and/or contents of a container using user input from a computing device, such as from a mobile phone or other mobile communication device. Generally, associating the sensing device with the particular size and/or contents of the container may refer to storing an association between these elements (e.g. storing a relationship, such as by storing a sensing device ID in a database together with a size and/or contents of a container, or linked to the size and/or contents of the container).

In some examples, a sensing device may be associated with a tap at a particular location. The sensing device may be associated with a tap, for example, by having a separate identification device (e.g. an RFID tag) encoded with an identification of the tap. To associate the tap with a particular sensing device, the sensing device may be paired with the MD tag encoding the tap number of the tap. Pairing the sensing device may generally refer to storing an association between the sensing device and the tap number (e.g. by storing the sensing device II) and the tap number in a database). To pair the sensing device with a tap number, the separate identification device (e.g. an RFID tag) may be read by the sensing device and the tap number encoded by the identification device may be transmitted to a computing system together with the sensing device ID.

Examples described herein may make use of sensing devices that may be positioned beneath a container for use in weighing the container and transmitting a weight of the container to a computing system. The weight of the container may be used, for example, to monitor contents of the container and/or product inventory.

Generally, any container may be used. In some examples, containers intended to hold liquids may be used. For example, kegs, barrels, vats, home water containers, or buckets may be used. In some examples, containers intended to hold food may be used. In some example, the container may include an outlet for dispensing the liquid (e.g. a valve and/or an outlet port). The liquid monitored may include, but not be limited to, beer, wine, spirits, juice, milk, water, soda, syrup, or vinegar.

Generally, the draft beer industry employs re-usable aluminum kegs to distribute draft beer. The kegs may be simple aluminum containers (e.g. containers) that can be filled with beer, pressurized, and then the beer flows out of a top-mounted valve. The keg typically embodies no technology beyond a simple pressure valve on the top. Kegs may have a spherical round bottom that is surrounded or collared with a round aluminum sheath that allows the keg to sit upright and level. This collar on the bottom of the keg, combined with the spherical round bottom, creates a constructed void or space under the keg (e.g. false bottom). In some examples, sensing devices described herein may be placed entirely within that constructed void or space (e.g. false bottom). The edges of the round aluminum sheath in those examples may not rest on the floor, rather the sensing device may rest on the floor, and the bottom of the keg container may be supported by the sensing device, with the collar raised above the floor. In some examples, sensing devices described herein may be placed beneath the collar such that the collar rests on the sensing device. Generally, sensing devices described herein may be positioned to weigh a container, such as a keg.

In some examples, a tap may be used to interface with kegs described herein and to dispense liquid from the keg. Generally, a number of taps may be fixed in place in a location (e.g. at a restaurant) and different kegs may from time-to-time be attached to any given tap. Examples described herein provide for associating (e.g. pairing) a sensing device to a particular tap. In this manner, example sensing devices described herein may transmit a tap number to which they are associated to a computing system.

An example sensing device 102 is shown in FIG. 1. The sensing device 102 includes pad 104 and body 106. An overall diameter of the sensing device 102 may be such that the sensing device 102 may be positioned under any of a variety of container sizes. For example, the sensing device 102 may fit under ½ barrel, 40 liter, 50 liter, ¼ barrel, and ⅙ barrel kids in some examples. The kegs may be fabricated from any of a variety of materials including, but not limited to, steel, aluminum, plastic, rubberized material, other commercially used materials, or combinations thereof.

The sensing device 102 may be constructed of material sufficiently strong to carry the large weight loads of containers described herein (e.g. a full keg) and capable of operating at low temperatures, such as would be encountered in a refrigerated location, and may include various types of plastics, composites, metals, and/or alloys.

In some examples, the body 106 is toroidal (e.g. doughnut-shaped, annular, ring-shaped, or circular and defining a center aperture), which may facilitate grasping the sensing device by placing a hand in the aperture. Other shapes may also be used, including circular and spoked having a center portion with load cells positioned in arms radiating outward from the center portion). Generally, the sensing device may be shaped to provide multiple load cells at different points on a container bottom to aid in accurately weighing the container and minimizing tipping or rocking of the container.

In some examples, the sensing device 102 may fit within an inner diameter of a cavity at a bottom of the container, for example within a false bottom of a keg. In other examples, the sensing device 102 may be positioned under a bottom-most portion of the container (e.g. the rims of the keg which would normally rest on a floor or other supporting surface may be placed on the sensing device 102). In some examples, the sensing device 102 may be clipped or otherwise attached to a container, but attachment may not be made in other examples.

The sensing device 102 includes one or more pads, such as pad 104, on a top surface of the sensing device 102. The pads, including pad 104, may be made of any of a variety of materials, including but not limited to, rubber. The pad 104 may have radially inwardly sloped (e.g., downwardly sloping in radially inward directions) top surfaces which may facilitate gripping the container (e.g. keg) placed above the sensing device 102 and may aid in keeping the sensing device 102 from shifting when the container (e.g. keg) is moved. The inwardly sloped top surfaces of pad 104 may additionally or instead assist the container (e.g. keg) in self centering on top of the sensing device 102.

Figure 2:
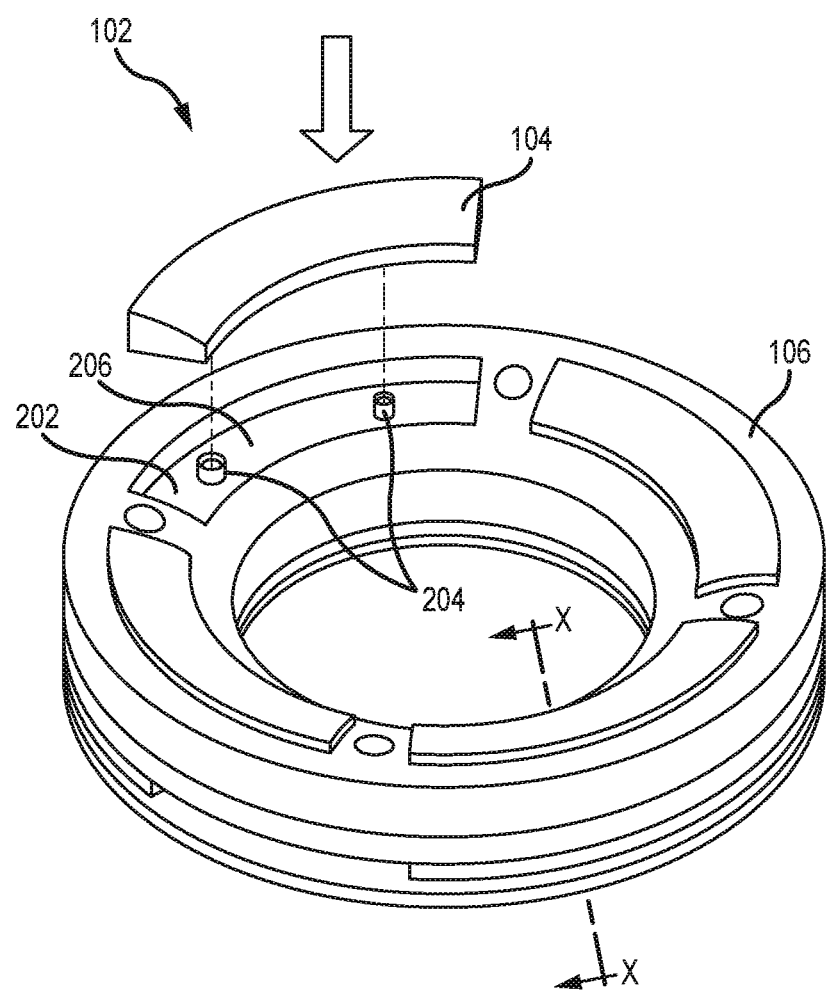
FIG. 2 is a schematic illustration of a sensing device arranged in accordance with examples described herein.

FIG. 2 is a schematic illustration of a sensing device arranged in accordance with examples described herein. The sensing device 102 includes body 106 having slot 202 and additional slots. The slots may be sized and shaped to receive a respective one of the pad 104. For example, the slots may be arcuate shaped. Posts, such as post 204 may project from a bottom surface 206 of slot 202, and any or all of the remaining slots. There may be any number of posts, and the posts may support the pad 104. The posts may be open, e.g. hollow.

When placed beneath a container (e.g. a keg), a bottom surface of the container may be supported by one or more of the pads, such as the pad 104. The sensing device 102 may be used to weigh a container placed on the sensing device 102.

Figure 3:
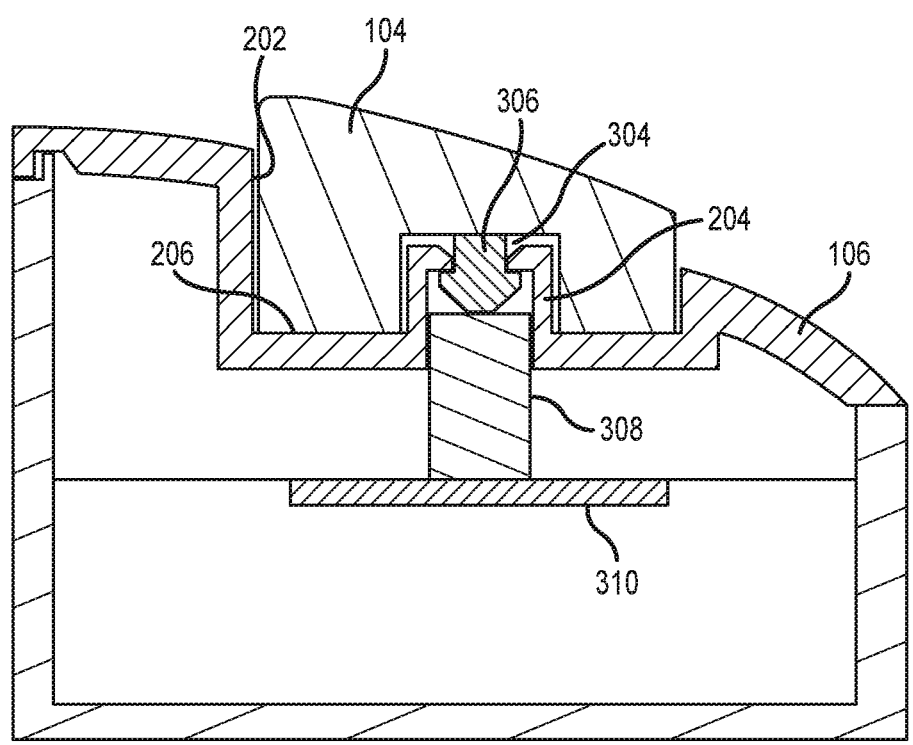
FIG. 3 is a schematic illustration of a sensing device arranged in accordance with examples described herein.

FIG. 3 is a schematic illustration of a sensing device arranged in accordance with examples described herein. Pad 104 A bottom surface of each may include a number (e.g. two) recesses, such as recess 304. The number of recesses may be selected, and each recess may be sized to receive a respective one of posts, such as the post 204. Extending from the bottom surface within each recess, such as the recess 304, may be a projection, such as the projection 306, which may be sized and shaped to engage with (e.g. be snap locked into) the respective post, such as the post 204. A distal end of the projection may press down on an electrical element (e.g. a load cell, such as load cell 308) when a keg rests upon one or more of the pads, such as the pad 104. Electronics mounted on a circuit board associated with one or more of the load cells, such as the circuit board 310 associated with the load cell 308, may measure the change in an electrical characteristic of the associated load cell, which characteristic may vary with the weight of the container. Thus, a weight of the container may be determined from the measurements of the electrical characteristics of the multiple load cells included in the sensing device 102. In the example of FIG. 1-FIG. 3, eight load cells may be used, each positioned beneath one of the projections, with two projections provided per pad. Load cells and the electronics mounted on circuit boards form a weight sensing arrangement that may be used to sense the weight of a container (e.g. keg) placed on sensing device 102.

Figure 4:
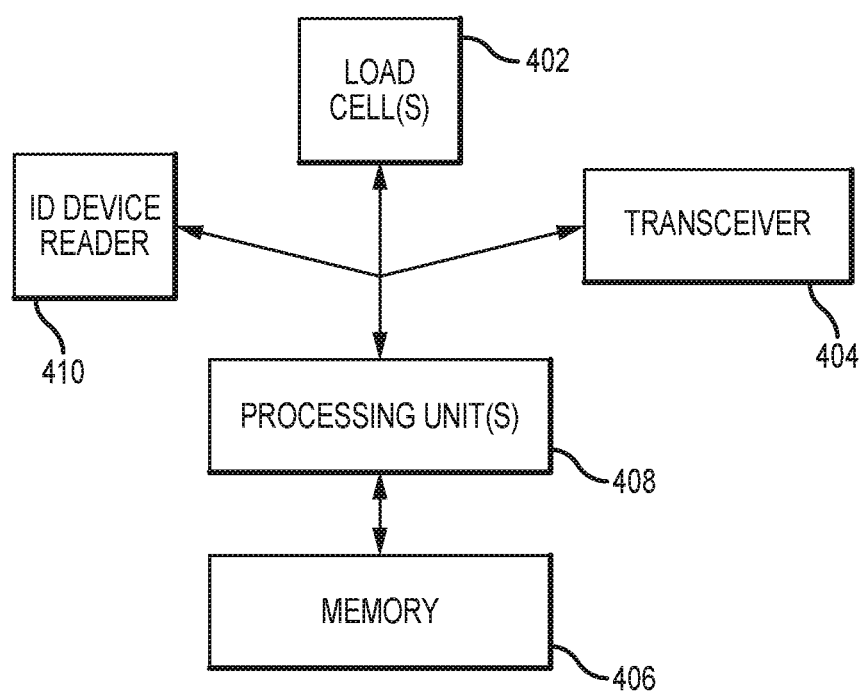
FIG. 4 is a schematic illustration of components included in a sensing device arranged in accordance with examples described herein.

FIG. 4 is a schematic illustration of components included in a sensing device arranged in accordance with examples described herein. The components shown in FIG. 4 may be housed within the sensing device, for example the sensing device 102 of FIG. 1-FIG. 3 or other sensing devices described herein. The sensing device 102 may include processing unit(s) 408, memory 406, ID device reader 410, load cell(s) 402, and transceiver 404.

Load cell(s) 402 may generally be implemented using one or more pressure sensors, which in at least one embodiment may be implemented using an analog electronic device that converts weight into an analog value calibrated to the weight of a full keg. When the sensing device 102 is placed under a container (e.g. a keg), the load cell(s) 402 may be supported by the floor or other surface and may be positioned to weigh the container. In some use scenarios, containers (e.g. kegs) may be stacked on top of each other. In such situations, the system vendor can supply a rigid, hard plastic mat (not shown) that can fit on the top of a container to provide a hard, level surface for a sensing device to be positioned on the next layer up to weigh a container placed on that sensing device. In examples stacking scenarios, the sensing devices on the bottom containers can be adjusted to account for there being more than one container resting on top of the load cell(s) 402, such as by transferring weight information to/from the containers above.

The load cell(s) 402 register pressure from the weight of the container. One or more processing unit(s) 408 (e.g. processor(s)) may be provided in the sensing device. For example, the processing unit(s) 408 may be implemented using one or more microcontrollers, which may include one or more analog-to-digital converters (ADCs). In some examples, the system may be calibrated for an anticipated weight of a full container such that when a full container that has a maximum volume and weight is placed on the sensing device, the load cell(s) 402 may register a maximum analog value, which may be converted into a digital value by the analog-to-digital converter (ADC). In some examples, the conversion uses an 8-bit value, while in others, another range of digital outputs (such as 0-20, or, in other embodiments, 0-10, 0-50, 0-100, or 0-240) is used. Using this latter form as an example, as the container is depleted, the value changes from 20 to 19, 18, 17, etc. all the way down to 0 (zero) in some examples, which may be the value corresponding to the weight of an empty container. Calibration parameters to associate the full container weight with the maximum analog value and the empty container weight with the minimum analog value may be stored, for example, in memory 406.

The weight value (e.g. 0-20) may be provided to transceiver 404 for transmission, e.g. to a gateway as described herein, in some examples, the transceiver 404 may be implemented using a separate transmitter and receiver. In some examples the transmitter and receiver may be combined. The transceiver 404 may transmit using any of a variety of wireless techniques and/or protocols. For example, the transceiver 404 may communicate with a local gateway using ZigBee protocols, Bluetooth protocols, other IEEE 802.15 protocols or IEEE 802.11 protocols, or similar wireless protocols. In some examples the local gateway may communicate with a larger network (e.g. a cellular telephone network or a mesh network). In other examples, the transceiver 404 itself may communicate to the larger network directly (e.g. a cellular telephone network or a mesh network). Other wireless or wired data transmission technologies may also be used.

In some embodiments, the sensing device may remain asleep and wake up periodically to receive a signal related to the current weight of the keg, communicate with the network (e.g., the cellular network, which may be via the local uplink/gateway) and transfer data to and/or from a database (which may take approximately 10-20 seconds in some embodiments), then go back to sleep. In one embodiment, the sensing device wakes up and communicates with the network once every hour. In other embodiments, the sensing device may wake up more or less frequently depending on the time of day or the day of the week/year. In still other embodiments, the sensor wakes up based on a schedule received from a database, which may be adjusted by the database. For example, if an algorithm evaluating data from a database determines that beer A is selling quickly and beer B is not selling quickly, a command can be sent through the network to one or more sensing devices associated with beer A (e.g., through a cellular network, which may be sent to the sensor via a local uplink/gateway) instructing the one or more sensors associated with beer A to wake up and communicate with the database every 20 minutes and/or a command can be sent through the network to one or more sensing devices associated with beer B instructing the one or more sensing devices associated with beer B to wake up and communicate with the database every 2 hours. In addition to sending instructions modifying the wake up schedule of a sensor, other software updates may also be delivered wirelessly from the network to the sensor/transmitter and/or the uplink. Software updates and other parameters may be stored, for example in the memory 406 of FIG. 4 and executed by the processing unit(s) 408 in FIG. 4.

The memory 406 may be implemented using generally any storage device, e.g. flash memory. The memory 406 may store (and in some examples may be preprogrammed with) several parameters. One of these parameters may be an ID number corresponding to the individual sensing device. For example, each sensing device may have its own unique ID number (e.g. serial number) that is programmed into the software (e.g. encoded in memory 406) when the sensing device is manufactured. In addition to the ID Number, the software version number may be pre-programmed in some examples. The keg transmitter software may also be programmed with certain functions and intelligence. For example, the software may be programmed at the factory to perform various functions, including waking itself up at predetermined times, at specific intervals of time, or upon the occurrence of specific events or actions and transmitting a signal via a wireless network (e.g., ZigBee, Bluetooth, or other) to check whether it is in range of a gateway. When the transmitter is shipped to an equipped warehouse, the sensing device can first wake up and connect with a gateway. At that point, the keg transmitter can begin to check for a gateway every hour or other interval.

Sensing devices described herein may include an ID device reader 410 or other receiver that may receive data from an identification device (e.g. an RFID device). The identification device may in some examples encode a number of a tap to which the sensing device will be associated. In some examples, the identification device may additionally or instead encode a characteristic of the fluid within the container to be placed on the sensing device. Examples of characteristics of the fluid within a container includes, but is not limited to, the brand-name, type, manufacture date, or other characteristic about the fluid a distributor, retail seller, or consumer would be concerned with. ID device reader 410 may be contained within a compartment (e.g., receiver cavity) of the sensing device that may be covered by a cover, and may optionally include a waterproof strip.

The ID device reader 410 may include an antenna, which may be the same or a different antenna than used to implement transceiver 404. The antenna for the ID device reader 410 may be contained within the same compartment as the remainder of the ID device reader 410. The ID device reader 410 may be implemented using a printed circuit board (PCB).

In some examples, the ID device reader 410 and ID devices may be configured for short range use to avoid interference with other RFID devices that may be present nearby. For example, in one embodiment, the pairing system and RFID device have a maximum pairing range of approximately 15 feet. In other examples, the pairing system and RFID device have a maximum pairing range of approximately five (5) feet. In yet other examples, the pairing system and RFID device have a maximum pairing range of approximately two (2) feet. In still further examples, the pairing system and RFID device have a maximum pairing range of approximately one (1) foot. The short range pairing feature may have particular advantages in environments where there are multiple containers with a sensing devices and RFID device attached to each container.

The transceiver 404 may communicates with a wireless network and may transmit information concerning the ID of the sensing device and the tap to which the sensing device is associated (which may be received from an ID device reader 410), and/or information about the weight of the container to the wireless network. In some examples, transmissions from the sensing device may include a characteristic of the fluid in the container which the sensing device is positioned to weigh. In some examples, characteristics of the fluid in the container and/or a size and contents of the container may be obtained from a user application operating on a separate user device as described herein.

Transceiver 404 may be contained in a compartment (e.g., transceiver cavity) of the sensing device, covered by cover, and an optional waterproof strip may be included to inhibit water from entering into the transceiver compartment. In some examples, transceiver 404 may be relatively planar in appearance and may be on a printed circuit board (PCB). In some examples, transceiver 404 is both a receiver and a transmitter capable of two-way communication with an ID device (e.g., RFID device) associated with the container containing information about the tap to which the container is associated and/or liquid contained within the container.

Sensing devices may include a battery compartment for housing a battery to provide electrical power to the various components of the sensing device. The battery compartment may be covered by a cover and an optional waterproof strip.

Figure 5:
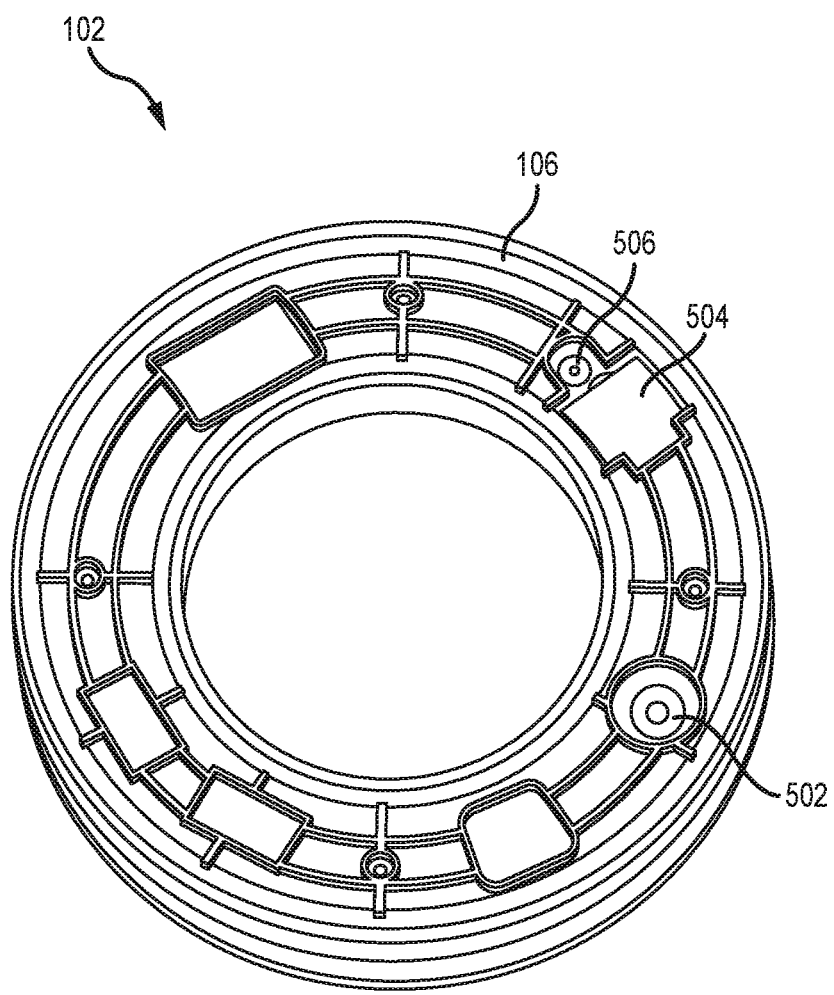
FIG. 5 is a schematic illustration of a bottom view of the sensing device shown in FIG. 1-FIG. 3 arranged in accordance with examples described herein.

A bottom view of the sensing device 102 is shown in FIG. 5. The body 106 may include a plate that may rest on a floor or other supporting surface. A receiving area 504 is shown that may receive an identification device (e.g. an RFID tag). The receiving area 504 is sized such that the tag may, for example, be placed or slid on the receiving area 504 while a user is holding the sensing device 102 and prior to placing the sensing device 102 on the floor or other supporting surface. When positioned on the receiving area 504, a user may depress button 502 to pair the sensing device 102 with the information encoded on the identification device. While a button is shown in FIG. 5, other user interfaces may be used in other examples, or no interface may be needed to begin the pairing, rather, the placement of the identification device itself on or near the receiving area 504 may be sufficient. An indicator 506 (e.g. light, speaker) may be provided to indicate that the sensing device 102 has been paired with the information (e.g. the sensing device 102 has stored the information encoded on the identification device).

In some examples, a tap number may be encoded on the identification device. The identification device may be used to pair the sensing device 102 with a tap. Accordingly, the sensor may transmit a tap number, in some examples together with a sensor 11) number, to a computing system. By providing a mechanism to pair the sensing device 102 with a tap, a user may update the association if the sensing device is moved to a different tap (e.g. by pairing the sensing device with a different identification device). In this manner, accurately maintaining an association between sensing devices and taps may be facilitated without a user needing to access or manipulate themselves a database including sensor ID numbers, for example.

In some examples, sensing devices may additionally be paired with information relating to a type and contents of a container placed on the sensing device. In some examples, the pairing of container type and contents may similarly be performed using an identification device encoded with the container type and/or contents. However, in some examples, pairing of the container type and contents to a sensing device may be performed by a user using software on a computing system and the association (e.g. pairing) may be performed remotely.

While sensing devices positioned beneath containers to weigh the containers have been described with references to FIG. 1-FIG. 5, in other examples, top-mounted or other sensing devices may be used to assess a liquid level in a container. Top-mounted sensing devices may use sound wave technology to send a sound wave through the top of the container. A transducer may be provided to produce sound waves which may bounce off the top of the liquid (e.g. beer) and return to the sensing device. The interval of time between the time at which the sound wave was sent and the time at which the return sound wave was received would be measured. This measurement would be transmitted to a computing system, which may convert the time interval into a percentage of volume of the liquid remaining. A short time interval would mean a fuller keg. A longer time would mean an emptier keg.

Examples of sensing devices are also described in U.S. Pat. No. 9,221,667, entitled "Draft beer supply chain systems and methods," PCT Publication WO 2013/177554 entitled "Draft beer supply chain systems and methods", U.S. Published Application 2014/0174568 entitled "Draft beer supply chain system and method," and PCT Publication WO 2015/066594 entitled "Draft beer supply chain systems and methods," all of which patents, publications and applications are hereby incorporated by reference in their entirety for any purpose.

Figure 6:
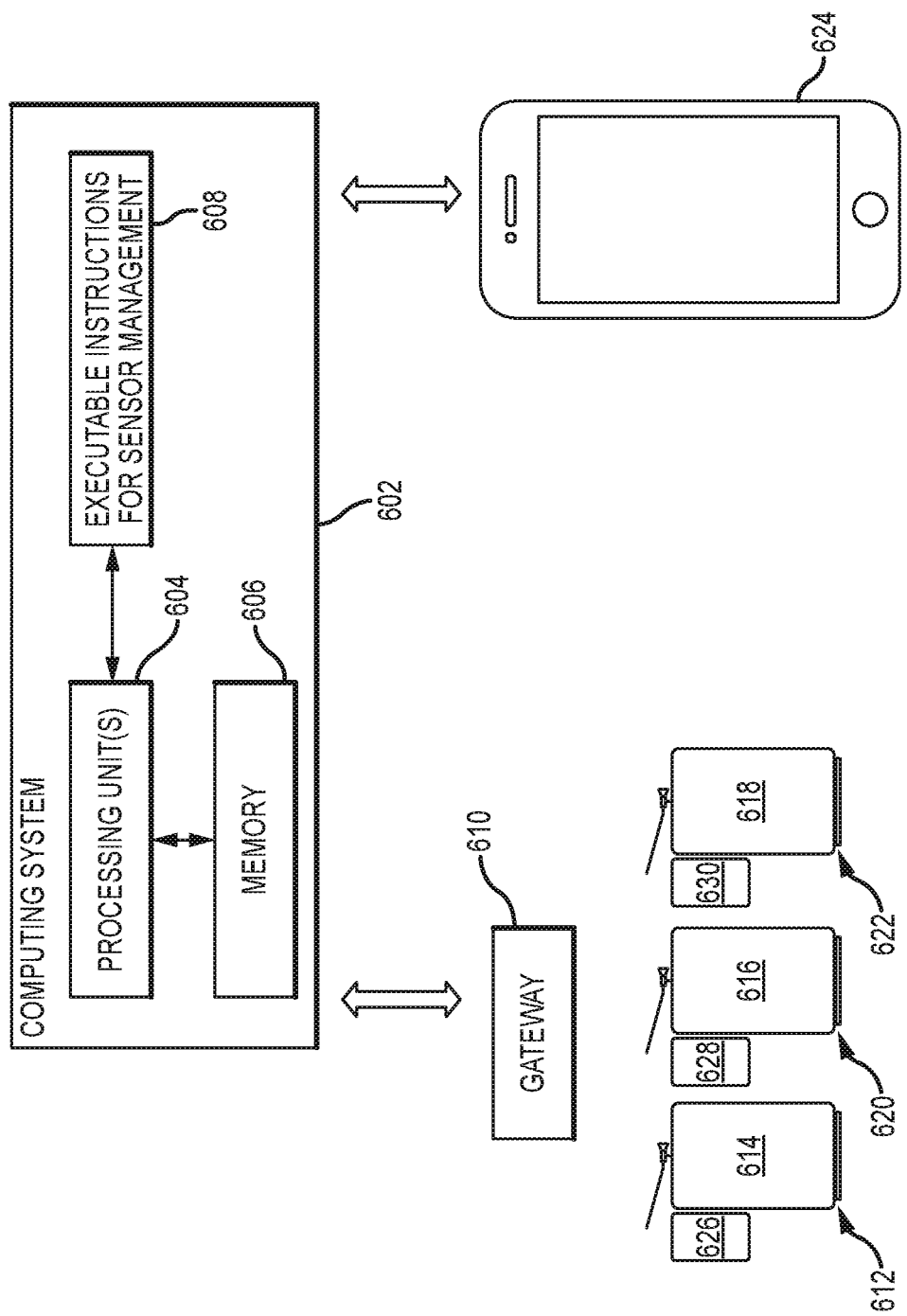
FIG. 6 is a schematic illustration of a system arranged in accordance with examples described herein.

FIG. 6 is a schematic illustration of a system arranged in accordance with examples described herein. The system of FIG. 6 includes a computing system 602, gateway 610, and mobile communication device 624. The system of FIG. 6 may include any number of containers (including depicted keg 614, keg 616, and keg 618) positioned to be weighed (e.g. placed on top of) by respective sensing devices—e.g. sensing device 612, sensing device 620, and sensing device 622. Identification devices may be associated with each container—e.g. identification device 626 associated with keg 614, identification device 628 associated with keg 616 and identification device 630 associated with keg 618.

Although kegs are described with respect to FIG. 6, any containers may be used in other examples.

Each of the kegs—keg 614, keg 616, and keg 618 in FIG. 6 may be connected to a tap, as shown in FIG. 6. In some examples, the taps may be numbered, and may have numbers displayed and/or tagged on the tap line itself. The identification devices—e.g. identification device 626, identification device 628, and identification device 630 may each be encoded with a particular tap number. For example, the identification devices may be implemented using RFID tags encoded with the particular tap numbers. In other examples, QR codes or other encoding techniques may be used. In some examples, the tap number may be printed on the identification device. The identification devices may be connected to the associated kegs in some examples (e.g. by affixing them to the kegs, tying them to the kegs, placing them on the kegs). In some examples, the identification devices may not be connected to the associated kegs. In some examples, the identification devices may be connected to and/or placed near the associated taps. When someone desires to pair a sensing device to a particular tap, the identification device associated with the tap may be obtained and used to pair with the sensing device (e.g. by placing the identification device within range of the sensing device and optionally pushing a button to initiate pairing).

Sensing devices may be placed under the respective kegs to weigh the respective kegs. The sensing devices may be implemented using any sensing devices described herein, including with regard to FIG. 1-FIG. 5.

The sensing devices—e.g. sensing device 612, sensing device 620, and sensing device 622, may be within range of gateway 610. For example, the sensing devices may be sufficiently near the gateway 610 to be able to transmit data to the gateway 610. The sensing devices may communicate with the gateway 610 using wireless communication techniques including, but not limited to, ZigBee and/or Bluetooth communication. The gateway 610 may communicate with the computing system 602 using communication techniques, including, but not limited to, cell phone communication protocols, and/or Ethernet.

Gateway 610 may in some examples be implemented using a self-contained unit that can be, for example, mounted on the wall, such as outside of the beer cooler, of an on-premises retailer (e.g. bar or restaurant) that contracted with their local beer distributor to use the service described herein. The gateway 610 may be a moisture-resistant, shock-resistant plastic box that contains radio receivers, computer hardware, computer software, and/or radio transmitters.

The computing system 602 may communicate with multiple gateways. Each gateway, such as the gateway 610, may have its own unique serial number that is encoded in the gateway software (e.g. stored at the gateway).

The gateway 610 may perform two functions in some examples. First, a hardware radio receiver and software stack of the gateway 610 may receive data transmissions from each sensing device within its range, which are typically the sensing devices in the nearby cooler or within the establishment where the gateway 610 is positioned. For example, the gateway 610 may receive data transmissions from sensing device 612, sensing device 620, and sensing device 622. Second, the receiver of the gateway 610 may receive the data, organize the data, and tag the data with information unique to the gateway 610 (e.g. the gateway's unique serial number and version number or other gateway ID). Once the receiver and software stack has organized that data, it may be sent to a different, perhaps wider network, e.g., a CDMA, GMA or like standard cellular connection gateway (e.g. the gateway 610 may be a "CDMA gateway").

Recall information about the tap to which each container (e.g. keg) is connected may also be communicated to the sensing devices (e.g. Sensing device 612, sensing device 620, and sensing device 622) using a separate ID device (such as an RFID device). The identification devices (e.g. Identification device 626, identification device 628, and identification device 630), may be attached to the respective containers (e.g. Keg 614, keg 616, and keg 618), and may be paired with the sensing devices associated with those containers (e.g. Sensing device 612, sensing device 620, and sensing device 622). For example, identification device 626 may be paired with sensing device 612 to reflect that keg 614 is connected to a particular tap number. In this manner, sensing device 612 may obtain the tap number and transmit the tap number, together with the sensing device ID number, to the gateway 610, which may in turn provide the information to another network (e.g. a CDMA network), such that the information may be provided to the computing system 602.

The gateway 610 may include a transmitter/receiver that contains both radio hardware and software. The gateway 610 in some examples may be provided by a wireless carrier partner, such as Verizon Communications, in some examples, of course, GSM and/or other wireless data transmission protocols may be used instead of or in addition to CDMA. The gateway 610 may join the carrier's data service by connecting the closest cell phone tower to the on premise retailer where the gateway has been placed. The gateway 610 may relay the data from sensing devices that have been collected by the gateway 610. The gateway 610 may communicate with the carrier's network to determine the location (e.g. longitude and latitude) of the gateway 610 and may transmit that location, its software version number, and/or data collected by the gateway 610 to the computing system 602.

In some examples, a CDMA gateway may not available, feasible, or desirable. Data from the sensing devices may be received by a hardware radio receiver and software stack in communication with the Internet via Wi-Fi or Ethernet access to a Local Area Network (LAN), which may in turn provide the data to computing system 602.

To setup the system, sensing devices (e.g. Sensing device 612, sensing device 620, and sensing device 622) may be paired to taps (e.g. using identification devices encoded with tap numbers) and placed under the containers connected to those taps. Once the sensing devices are placed, they may be in radio range to join a network including the sensing devices of others or all containers at the premises (e.g. in the cooler) as well as the gateway 610. When the sensing device joins the network, the sensing device may begin transmitting data. The data transmitted can include one or more weight parameters (e.g. a relative weight such as 0-20 as described herein, and/or a weight) indicative of the weight of the container placed on the sensing device, an ID number of the sensing device (e.g., # KS1234), and/or the version number of the software of the sensing device (e.g., ver 1.0).

The data may be transmitted to the gateway 610. The gateway 610 may act as a conductor collecting data from all sensing devices at the location (e.g. in the cooler and/or on the premises) and may maintain its own serial number (# UG5678) and its own location data (e.g., latitude and longitude, such as latitude: 39.77572; longitude: −86.15569). The gateway may collect sensor data and add its own data that may be transmitted via the carrier's cell phone data network to the computing system 602. So an example data feed may look like:

sensing device sends a data string:
        keg_sensor_serial=KS1234&;weight_parameter=10&; keg_sensor_version=1.0&;gateway_version=1.0&;keg_rfid=1234

This data string may be received by the gateway 610, and the gateway embedded software adds its data. The combined data string in this example would then be:

uplink_gateway_serial=UG1234&;long=39.77572&;lat=−86.15569&;=5; keg_sensor_serial=KS1234&;weight_parameter=10&;keg_sensor_version=1.0&;gateway_version=1.0&;keg_rfid=1234

When there are multiple sensing devices communicating with a single gateway, the combined data string may look like:

uplink_gateway_serial=UG1234&;long=39.77572&;lat=−86.15569&;=5&;keg_sensor_serial=KS1234&;weight_ parameter=10&;keg_sensor_version=1.0&;gateway_version=1.0&;keg_rfid=1234;keg_sensor_serial=KS5678;weight_parameter=4&;keg_sensor_version=1.0&gateway_version=1.0&;keg_rfid=5678;keg_sensor_serial=KS91011&;weight_parameter=3&;keg_sensor_version=1.0&;gateway_version=1.0;keg_rfid=9 1011

The data may be collected and sent by the gateway through the cell data network, then over the Internet to the computing system 602. Upon receipt by the computing system 602, the collected data from the sensing devices can be correlated and saved in a database (e.g. in memory 606) in many different ways.

The sensing device Serial Number may be correlated to an SKU that matches the beer brand and type. The correlation between the Serial Number and SKU may be preprogrammed into the computing system 602 or may be provided via a user device application as described herein.

For example, a user may provide an indication that taps 1-3 have been tapped to kegs container beer brand and type "Bell's Founder's Ale," which is SKU998877665544, and if Serial Numbers KS0000 through KS1234 have been assigned to taps 1-3, then when the computing system receives data from Sensor Serial Number KS1234, the computing system may write the data into the database as being associated with that SKU, beer brand and type "Bell's Founder's Ale." The computing system software can have programmed intelligence that also converts the weight parameter into a percentage of volume. So, for example, if the keg sensor sends a weight measurement of 10 on a scale of 0-20, that means the keg is half-weight, thus half-full. The computing system software may convert weight to volume. 20 is full, for example, 100%. 0 is empty, 0%. The scale of 0-20 is, therefore, converted by the computing system software to 20 steps of volume in percentage units.

The gateway can add its data to show the location of not only the gateway, but also the location of the sensing devices that it is collecting data from. As an example, assume that in the computing system software the gateway serial number UG1234 has been assigned to the location of retailer "Scotty's Bar and Restaurant." So when the transmission of data from a sensing device is made through the gateway, the location of the keg may be known. So, for example, a sensing device KS1234 with weight parameter 10 may be transmitted to the computing system 602 through gateway 610. The computing system 602 may already have a stored location of the gateway 610, the association of the keg sensing device to SKU Beer Type, and the conversion of weight to volume. When each transmission of data occurs computing system assigns a date and time stamp converted from UTC (Coordinated Universal Time) to local time. So when the transmission of data occurs, and the computing system receives the data, the data is converted to report that the particular keg of "Bell's Founder's Ale" currently located at "Scotty's Bar and Restaurant" is 50% full at 10 PM today, which may be recorded in a single time zone such as UTC/GMT. When using a single time zone, the software optionally converts the UTC time stamp into local time.

KS1234=Bell's Founder's Ale
    UG1234=Scotty's Bar and Restaurant
    Volume=50% (weight value of 10 converted to %)
    Date-Time=10.27.14 10:00:15 PM UTC The embedded software in the sensing devices can have intelligence built in. For example, the sensing device software may regulate the time factor of how often the data is transmitted from the sensing device to the gateway. In one example, the software is set to send data every hour time period, but that time period can be changed. The sensing device software may have the intelligence to transmit data only if the weight value has changed. The sensing device can also have the ability to transmit the ambient temperature around the container (e.g. the cooler temp) and the sending sensing device's remaining battery life as a percentage.

In some examples, the sensing device may use short-range radio technology (e.g., ZigBee and/or Bluetooth) to connect and send data through the gateway. In some examples, the sensing device itself may make a direct wireless (e.g. cell data and/or Ethernet) connection so that the sensing device can transmit its data directly to the computing system 602.

Although one gateway is shown in FIG. 6, it is to be understood that many gateways, which may each be positioned at different locations (e.g. different establishments or different areas within a single establishment, or both), may communicate with the computing system 602.

The computing system 602 may be implemented using any of a variety of computing systems, including but not limited to one or more desktop, server, laptop, or other computers. In some examples, the computing system 602 may provide software as a service (SaaS). The computing system 602 generally includes one or more processing unit(s) 604. The processing unit(s) 604 may be implemented using one or more processors, for example, having any number of cores. In some examples, the processing unit(s) 604 may include circuitry, including custom circuitry, and/or firmware for performing functions described herein.

The computing system 602 may include memory 606. The memory 606 may be implemented using any storage medium accessible to the processing unit(s) 604. For example, RAM, ROM, Flash, SSD, hard drive, optical storage, or combinations thereof, may be used to implement memory 606. The memory 606 may store associations described herein between sensing device IDs, taps, container size, container contents (e.g. brand, brew type, identification of liquid in the container), container weight, and/or location. Other aspects of the environment that may be sensed and transmitted by sensing devices described herein may also be stored including, but not limited to, temperature, humidity, light level, and combinations thereof.

The computing system 602 includes computer readable media 608 which may be encoded with instructions executable by the processing unit(s) 604. The computer readable media 608, for example, may be encoded with executable instructions for sensor management. The executable instructions for sensor management may include instructions for receiving data from one or more gateways described herein, including gateway 610, and processing that data (e.g. to identify a location from which the data was transmitted, identify a weight or fractional fullness of a container based on received data). The executable instructions for sensor management may further include instructions for identifying, based on changes in weight communicated by one or more sensing devices, that a new or different container had been placed on a sensing device. The executable instructions for sensor management may further include instructions for providing a notification that a new or different container had been placed on a sensing device and providing suggestions for the size and/or content of the container, examples of which are described herein.

It is to be understood that the arrangement of computing components of the computing system 602 may be quite flexible, and although shown as collocated components, the shown components may be distributed in some examples. The computer readable media 608 and the memory 606 may in some examples be implemented using the same media, and in other examples may be implemented using different media. The computing system 602 may further include any number of input devices, output devices, and/or peripheral components.

Mobile communication device 624 may be implemented using any user communication device, including but not limited to, a desktop, laptop, cellular phone, tablet, appliance, automobile, or combinations thereof. The mobile communication device 624 may be programmed with an application (e.g. the mobile communication device 624 may have one or more processing unit(s) and computer readable media encoded with instructions which, when executed, cause the mobile communication device 624 to perform described functions) for associating one or more sensing devices with a size and contents of a container. For example, the mobile communication device 624 may be programmed to receive a notification from computing system 602 that a new or different container had been placed on a particular sensing device. The mobile communication device 624 may receive and provide to a user and/or may generate and provide to a user one or more recommendations for the size and content of the new or different container. A user may utilize the mobile communication device 624 to input the size and contents of the new or different container, and the size and contents may be communicated to the computing system 602 and associated with the sensing device in the memory 606.

The mobile communication device 624 may include a display for display of notifications and/or recommended size and contents of containers. The display may additionally or instead be used to display data from the memory 606 pertaining to an inventory of containers. The mobile communication device 624 may be implemented with any of a number of input devices including, but not limited to, a touchscreen, keyboard, mouse, microphone, or combinations thereof.

Figure 7:
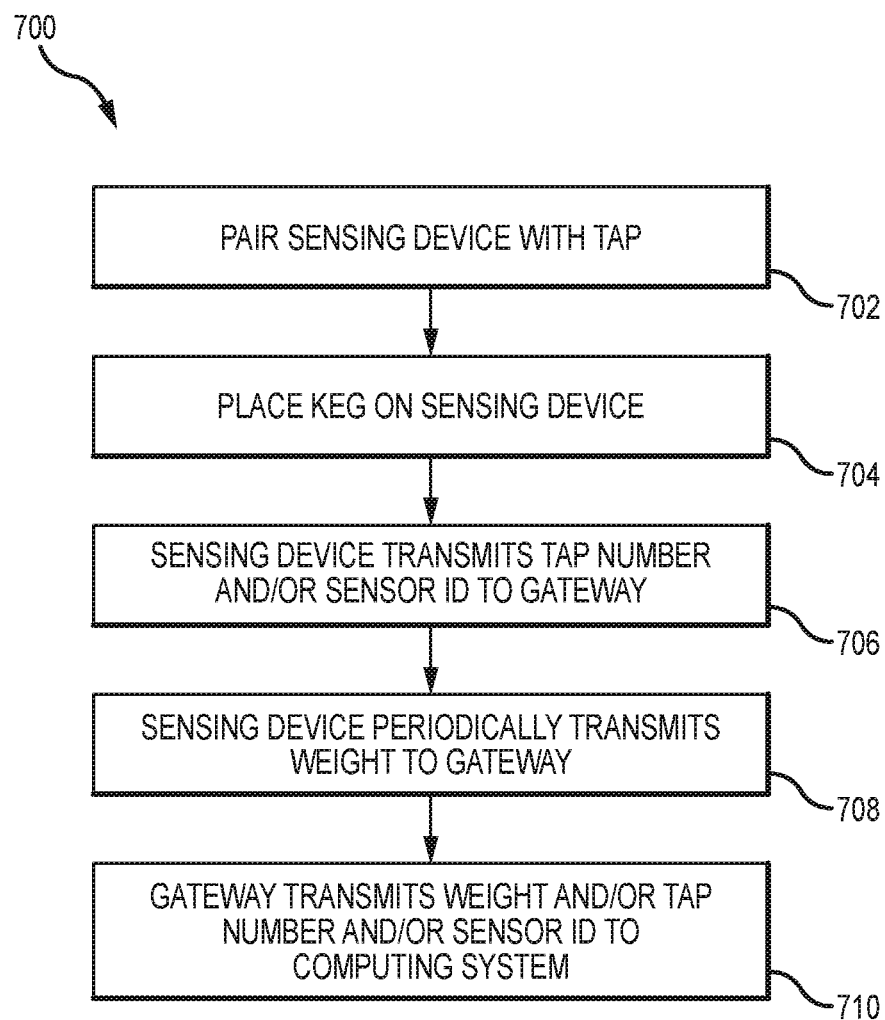
FIG. 7 is a flowchart of a method in accordance with examples described herein.

FIG. 7 is a flowchart of a method in accordance with examples described herein. The method 700 is shown as a sequence of blocks. In some examples, the blocks may be re-ordered and/or the actions described with respect to some blocks may happen simultaneously or overlapping in time.

A sensing device may be paired with a tap in block 702. Any sensing device described herein may be used to pair with a tap. Pairing may be effected in a number of ways. In some examples, a tap number may be pre-programmed in the sensing device (e.g. the tap number may be stored in a memory of the sensing device (and/or transmitted with or without storage) at the factory or prior to or contemporaneously with delivery to a location of use). In some examples, an identification device (e.g. an RFID tag, a QR code, a paper with a printed number) may be encoded with a tap number. The identification device may be read by the sensing device (e.g. using an RFID reader and/or camera). For example, an RFID tag encoded with a tap number may be placed in a receiving area, such as receiving area 504 of FIG. 5 of a sensing device. Once placed, a user may initiate pairing by, for example pressing button 502. As described with respect to FIG. 5, and indicator may be provided to indicate when pairing is complete. The encoded number may be decoded and stored in a memory of the sensing device and/or transmitted without storage.

In this manner, a particular sensing device may be associated with a tap number. In some examples, pairing with a tap may not be performed. However, it may be advantageous in some examples to provide a process to pair a sensing device with a tap so a sensing device may be more easily changed between taps. If a sensing device is moved to a different tap, the block 702 may be repeated to pair the sensing device with a different tap.

In block 704, a container (e.g. a keg) may be placed on the sensing device. In some examples, the container may be positioned relative to the sensing device in such a way to allow the sensing device to measure contents of the sensing device (e.g. in some examples, the container may be below the sensing device). Any of the sensing devices described herein may be used to implement block 704. The sensing device may begin to obtain a weight of the container (including the weight of the contents of the container). In other examples, the sensing device may begin to measure the contents.

In block 706, the sensing device may transmit the tap number to a gateway (and/or directly to a computing system in some examples). Additionally or instead, the sensing device may transmit an ID of the sensing device to the gateway (and/or directly to a computing system in some examples).

In block 708, the sensing device may periodically transmit an indicator of the weight of the associated container (including contents of the container) to the gateway (and/or directly to a computing system in some examples). The indicator of the weight may be the weight itself, or it may be a value corresponding to a relative fullness of the container as described herein. The gateway 610 of FIG. 6 may be used to implement the method 700. For example, the sensing device 612, sensing device 620, and sensing device 622 may transmit to gateway 610 in block 706 and block 708. Any frequency of transmissions may be used in blocks 706 and 708, including regular and irregular updates. Any wired or wireless communication mechanism may be used, including, for example, ZigBee or Bluetooth.

In block 710, the gateway may transmit the weight and/or tap number and/or sensor ID to a computing system. For example, the gateway 610 may communicate with the computing system 602 of FIG. 6 in block 710. In this manner, the computing system 602 may maintain an accurate and up-to-date association between sensor ID, tap number, and weight of the associated container (and contents thereof). The associations may be stored, for example in the memory 606 in any of a variety of forms, including a database. Any frequency of transmissions between the gateway and the computing system may be used. The communication may occur using any wired or wireless communication mechanism, including, for example, a cellular protocol and/or Ethernet.

Figure 8:
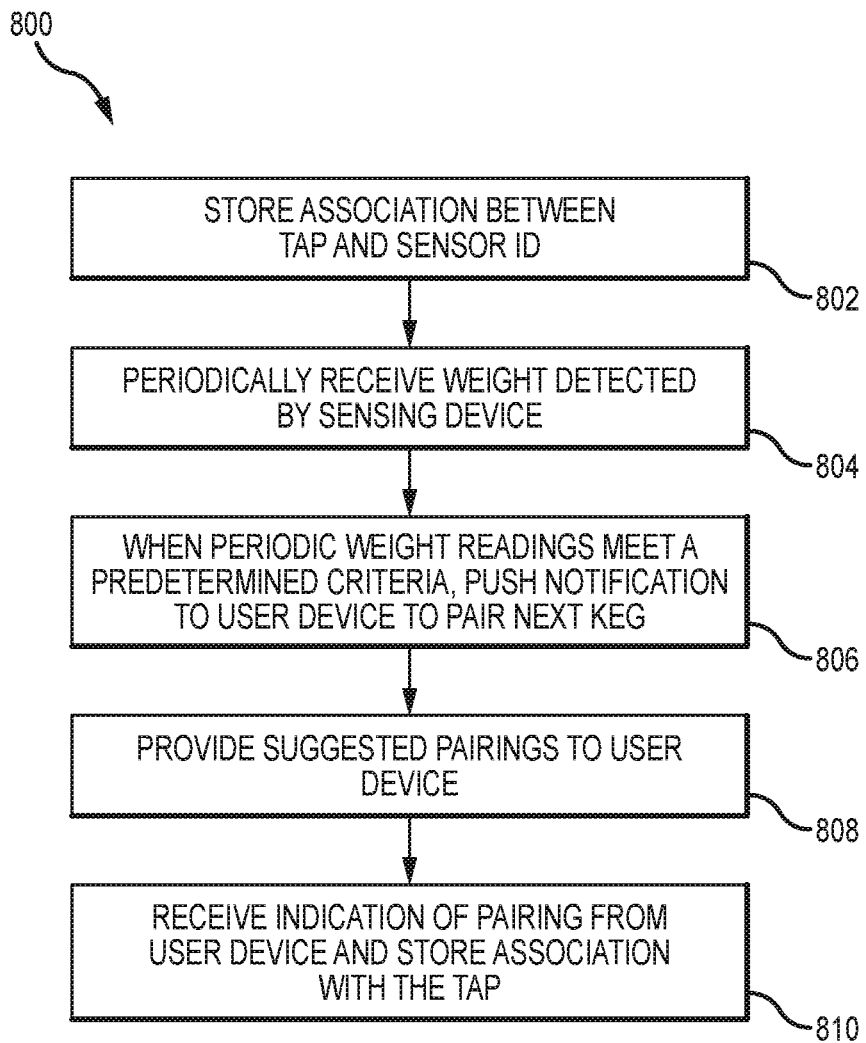
FIG. 8 is a flowchart of a method arranged in accordance with examples described herein.

FIG. 8 is a flowchart of a method arranged in accordance with examples described herein. The method 800 is shown as a sequence of blocks. In some examples, the blocks may be re-ordered and/or the actions described with respect to some blocks may happen simultaneously or overlapping in time.

In block 802, an association may be stored between a tap and a sensor ID. For example, the association may be stored by the computing system 602 in the memory 606 of FIG. 6, and the association may be implemented in a database. In block 804, an indication of a weight detected by a sensing device may periodically be received. For example, the indication of weight may be received by the computing system 602, and may be stored by the computing system 602, for example in the memory 606, in association with the sensor ID of the sensing device providing the weight indication. In some examples, the weight indication may be converted into an actual weight value and/or a relative fullness indicator of the container being monitored by the sensing device.

In block 806, when the periodic weight transmissions meet a predetermined criteria, a notification may be pushed to a user device to pair a next container (e.g. keg). Pairing a next container generally refers to associating a size and/or contents of a container with the sensing device associated with that container. Generally, a user device may receive a notification to pair a sensing device with a next container when the container is depleted and/or changed. Accordingly, the predetermined criteria used in block 806 may be criteria indicative of a depletion and/or change of container. For example, if consecutive weight readings increase by greater than a threshold amount, a user notification may be sent to pair the next container. In another example, if an indication of weight drops below a first threshold (e.g. below 15 percent fullness in some examples, below 10 percent fullness in some examples, below 5 percent fullness in some examples, below 2.5 percent fullness in some examples), followed by a subsequent indication of weight over a second threshold (e.g. over 80 percent fullness in some examples, over 85 percent fullness in some examples, over 90 percent fullness in some examples, over 95 percent fullness in some examples), a user notification may be sent to pair the next container. The executable instructions for sensor management encoded on the computer readable media 608 of FIG. 6 may include instructions for analyzing the indications of weight received from a sensing device and evaluating the indications of weight in accordance with the predetermined criteria, and pushing the notification to a user device responsive to the predetermined criteria being met. In some examples, the predetermined criteria and any thresholds used may be stored in memory 606 and/or other storage accessible to the computing system 602.

When the predetermined criteria are met, indicating depletion and/or change of a container associated with a sensing device, the computing system 602 may notify a user associated with the sensing device. A user may have an account indicating an association with particular sensing devices (e.g. an owner or manager of an establishment utilizing several sensing devices). The computing system 602 may notify the user of the need to pair a next keg, for example, by pushing a notification (which may be implemented as an email, text message, audio message, video message, or other notification) to a user device associated with the user. For example, a notification may be sent to a user's phone number, email address and may be accessed using a user device. The user device may be programmed with an application to receive such notifications. The notification would generally include a message indicating a particular tap number had been depleted and/or replaced and a prompt to indicate the container size and contents of the next container.

In some examples, instead of evaluating periodic weight readings in block 806 to determine when to push a notification to a user device to pair a next container, a signal may be sent from the sensing device specifically indicative of a change of container. For example, an individual responsible for changing containers associated with the sensing device may depress a button or other input on the sensing device which may be programmed to transmit a signal through the gateway to a computing system indicative of a container change. Responsive to the signal indicative of a container change, the computing system may notify a user device to pair a next container.

In block 808, suggested pairings may be provided to the user device. For example, one or more suggested sizes and/or contents of a container may be provided to and/or displayed at the user device (e.g. Mobile communication device 624) for selection by a user to associate with the sensing device. The executable instructions for sensor management encoded in the computer readable media 608 may include instructions for providing the suggested pairings. In some examples, executable instructions encoded on computer readable media and executed by one or more processing unit(s) of the user device (e.g. included in a user device application) may include instructions for providing and displaying the suggested pairings.

The suggested pairings may be made based on the indication of weight received from the sensing device. The suggested pairing may include a size and contents of the container suggested to be paired with the sensing device. Examples of sizes include, for example, ½ barrel, 40 liter, 50 liter, ¼ barrel, and ⅙ barrel kegs. Examples of contents include particular brands and brew types of beer products (e.g. Coors, Coors Light, Elysian Space Dust IPA, Guinness). In some examples, the contents may include the brewery name, beer type (e.g. pilsner, IPA, amber, brown, stout, seasonal), alcohol content, and/or name, or combinations thereof. Generally, contents refers to the identity of the liquid in the container.

For example, a database of full weights of various container sizes and/or contents may be reviewed for those having weights corresponding to the indication of weight received from the sensing device. Those having matching weights, and/or matching weights within a range, may be provided as suggested pairings. In some examples, a fixed range of weights may be allocated to each of a plurality of sizes of containers (e.g. different size kegs), and a size keg may be suggested whose weight range corresponds with the indication of weight provided by the sensing device.

In some examples, the suggested pairings may be based on inventory. For example, the computing system 602 and/or mobile communication device 624 may access a stored database reflecting available inventory at a location where the sensing device is in operation. The suggested pairings provided in block 808 may be selected from the available inventory. In some examples, both the available inventory and expected weight of the available inventory may be used to provide the suggested pairings. For example, containers in the available inventory whose expected weight matches (within a range) the indication of weight of the new container received from the sensing device may be provided as suggested pairings.

In some examples, the suggested pairings (and/or an order in which suggested pairings are displayed) may be based on popularity of certain liquids at the location housing the sensing device, or popularity within a larger group of locations including the location housing the sensing device. For example, suggested pairings may be based on consumption data of what contents have been selling quickly and/or profitably at the location. The location may be the establishment at which the sensing device is operating. The location may be the city, state, zip code, country, or other geographical area in which the sensing device is operating. The location may be a type of establishment—e.g. sports bar, upscale restaurant. A database of usage data across many systems may be consulted in making the recommendation. For example, the memory 606 or other memory accessible to the computing system 602 may store usage data obtained through sensing devices in the system of FIG. 6 and/or in other systems utilizing sensing devices and accessible to the computing system 602. The usage data may be utilized to formulate recommendations in accordance with popular and/or profitable brews.

The suggested pairings may be displayed, for example, in a list or other graphical display on a user device (e.g. Mobile communication device 624 of FIG. 6). In some examples, a user may search, using the user device, for suggested pairings. In some examples, the suggested pairings may appear based on partial input from a user (e.g. if a user begins to type C . . . O . . . suggested pairings for "Coors" and "Coors Light" and other available suggestions beginning with CO may be provided).

In block 810, an indication of pairing may be received from a user device. The indication may be made at the user device, for example, by indicating one of the suggested pairings (e.g. by clicking, touching, highlighting or speaking). In some examples, the indication may be made by typing a size and/or content of the container using an input device. The indication may not always be one of the suggested sizes and/or contents.

Once the indication of the pairing is received (e.g. at the computing system 602 of FIG. 6), the indicated size and/or contents may be stored in association with the tap and sensing device, for example in the memory 606. In this manner, the memory 606 may include updated associations between sensing device IDs, taps, and sizes and/or contents of containers. The data may be used to provide reports, notifications, menus, or other displays and/or analysis.

In some examples, user input may not be used to pair size and/or contents with a next container. In some examples, a sequence of sizes and/or contents may be stored (e.g. in memory 606 of FIG. 6 and/or in a sensing device itself). For example, if a known sequence of containers will be placed on a sensing device (e.g. Beer A followed by Beer B followed by Beer C, the sequence may be stored). When the predetermined criteria indicative of a container replacement is met in block 806, instead of pushing a notification, the next size and contents in the sequence may be associated with the sensing device, and the new association stored, e.g. in the memory 606.

A sequence of screenshots from a user device display are described herein to illustrate a user view of matching a container to a tap in accordance with examples described herein. The sequence of screenshots, shown in FIG. 9-FIG. 13 refer to the tap instead as "tag". In some examples described herein, sensing devices may be associated with a number, which may be a tap number, or may be an arbitrary or other number. As described herein, the association between the sensing device and the number may be made, for example, using an identification device encoded with the number. The number is referred to as a 'tag' number in FIG. 9-FIG. 13. In some examples, the 'tag' number may be a tap number.

The screenshots in FIG. 9-FIG. 13 may be displayed, for example, on mobile communication device 624 of FIG. 6.

Figure 9:
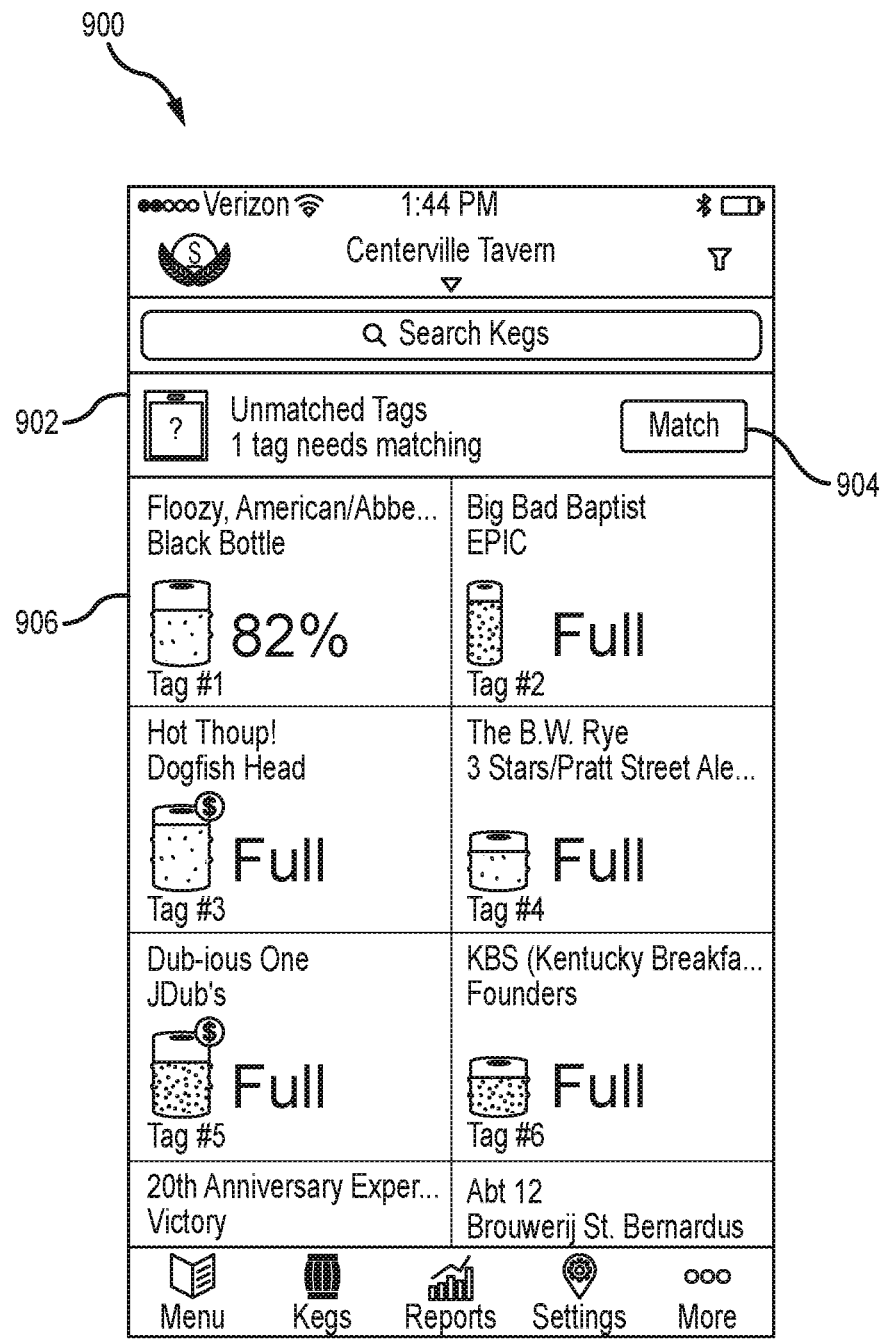
FIG. 9 is a screenshot from a user device display arranged in accordance with examples described herein.
Figure 10:
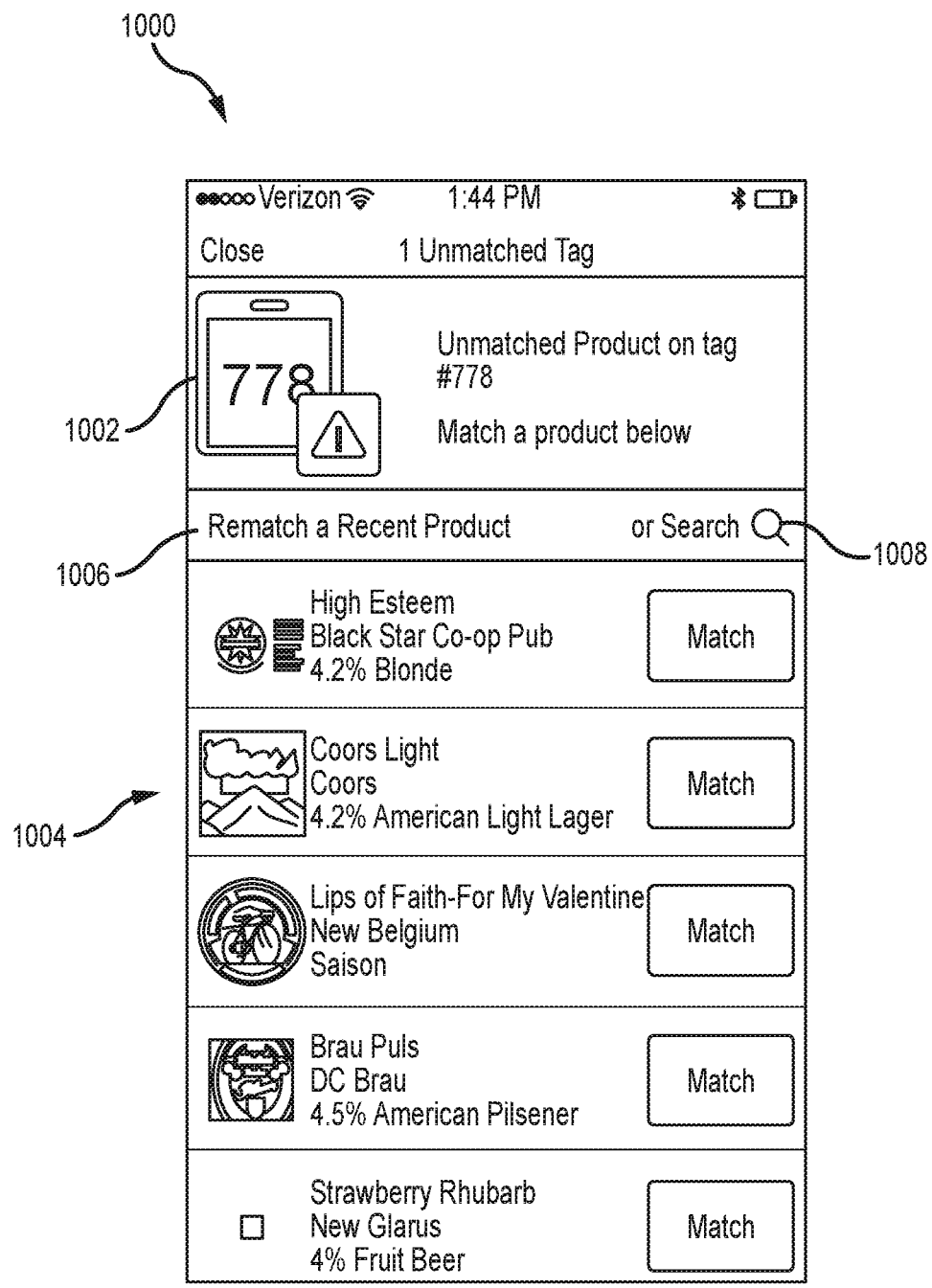
FIG. 10 is a screenshot from a user device display arranged in accordance with examples described herein.
Figure 11:
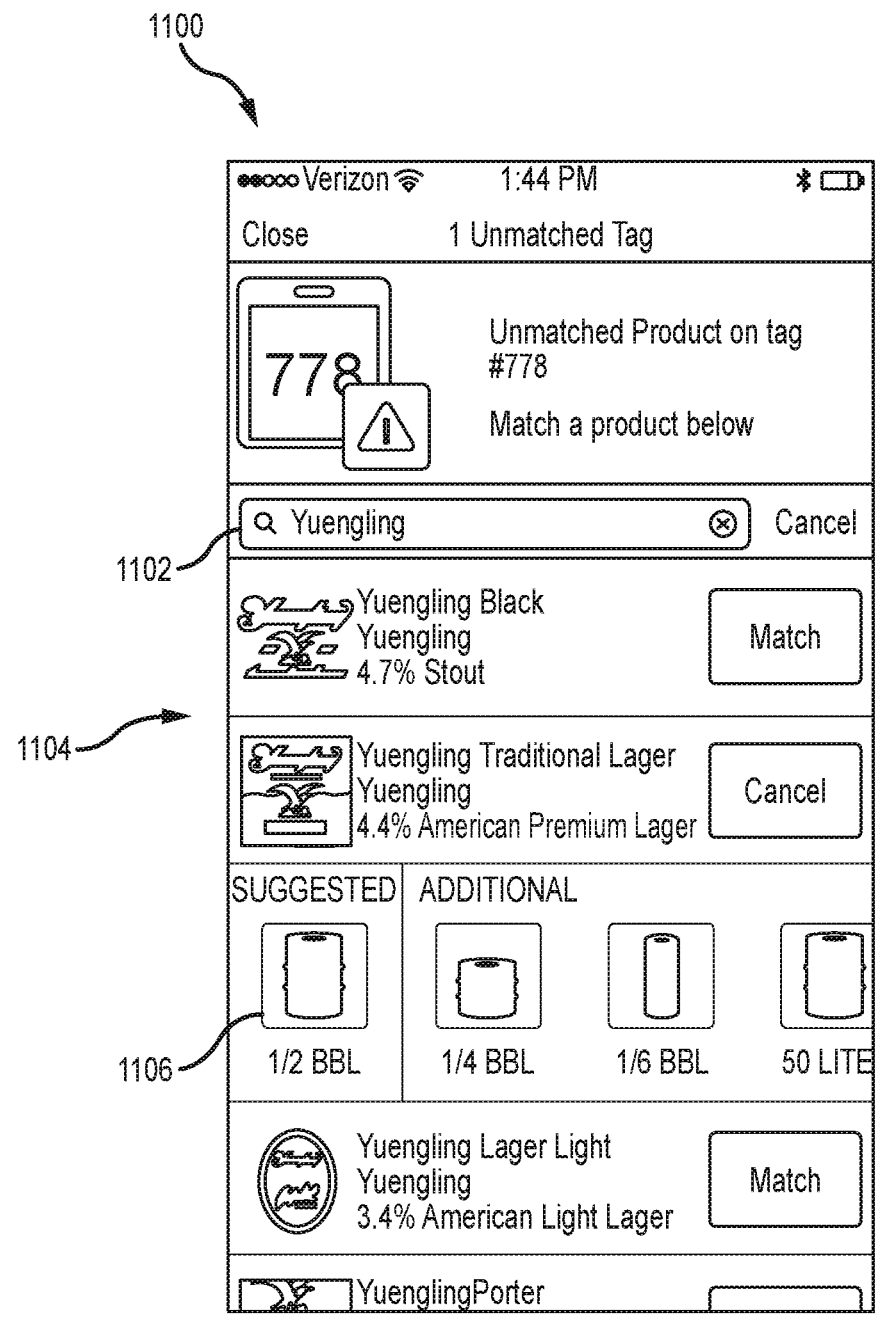
FIG. 11 is a screenshot from a user device display arranged in accordance with examples described herein.
Figure 12:
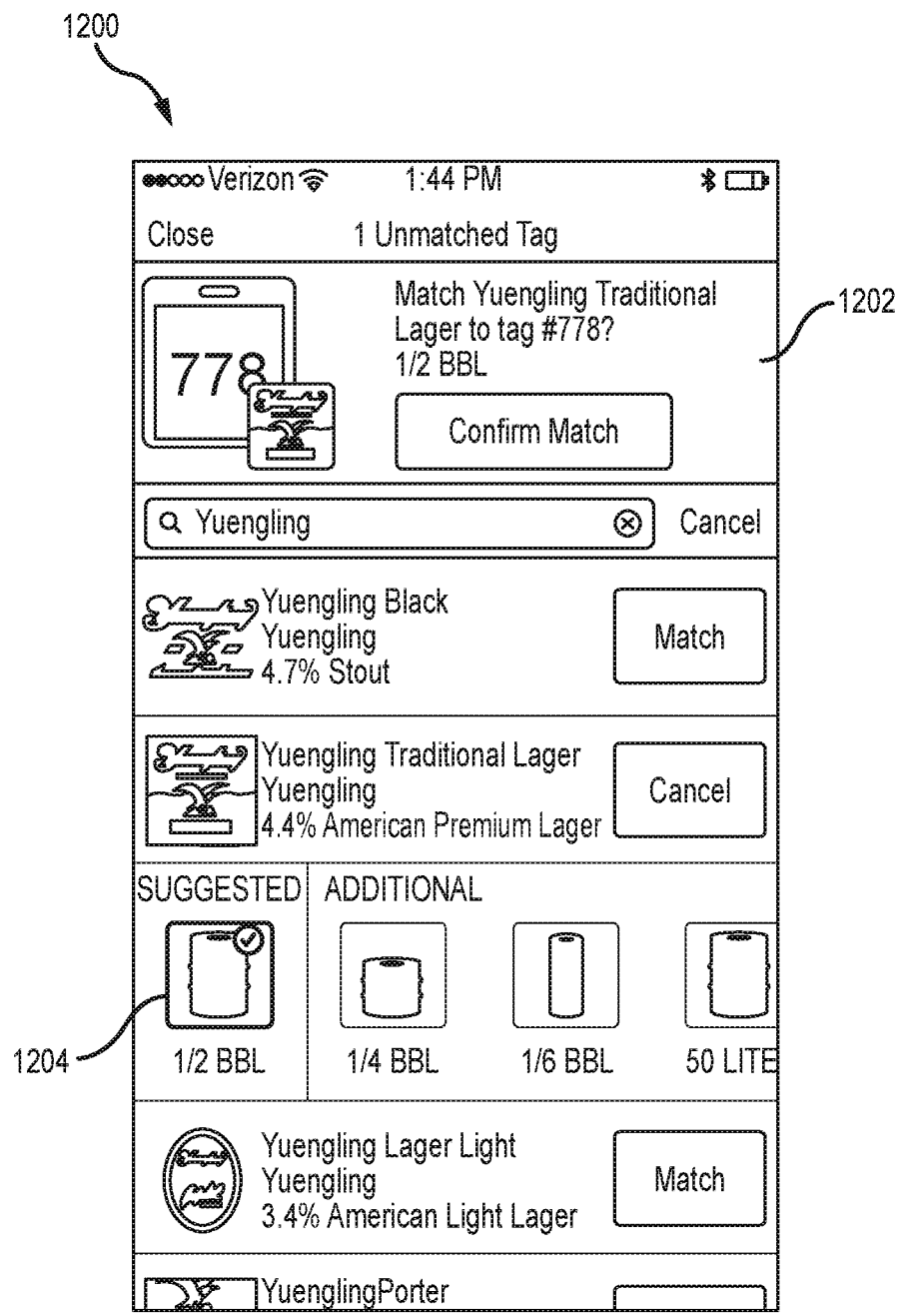
FIG. 12 is a screenshot from a user device display arranged in accordance with examples described herein.
Figure 13:
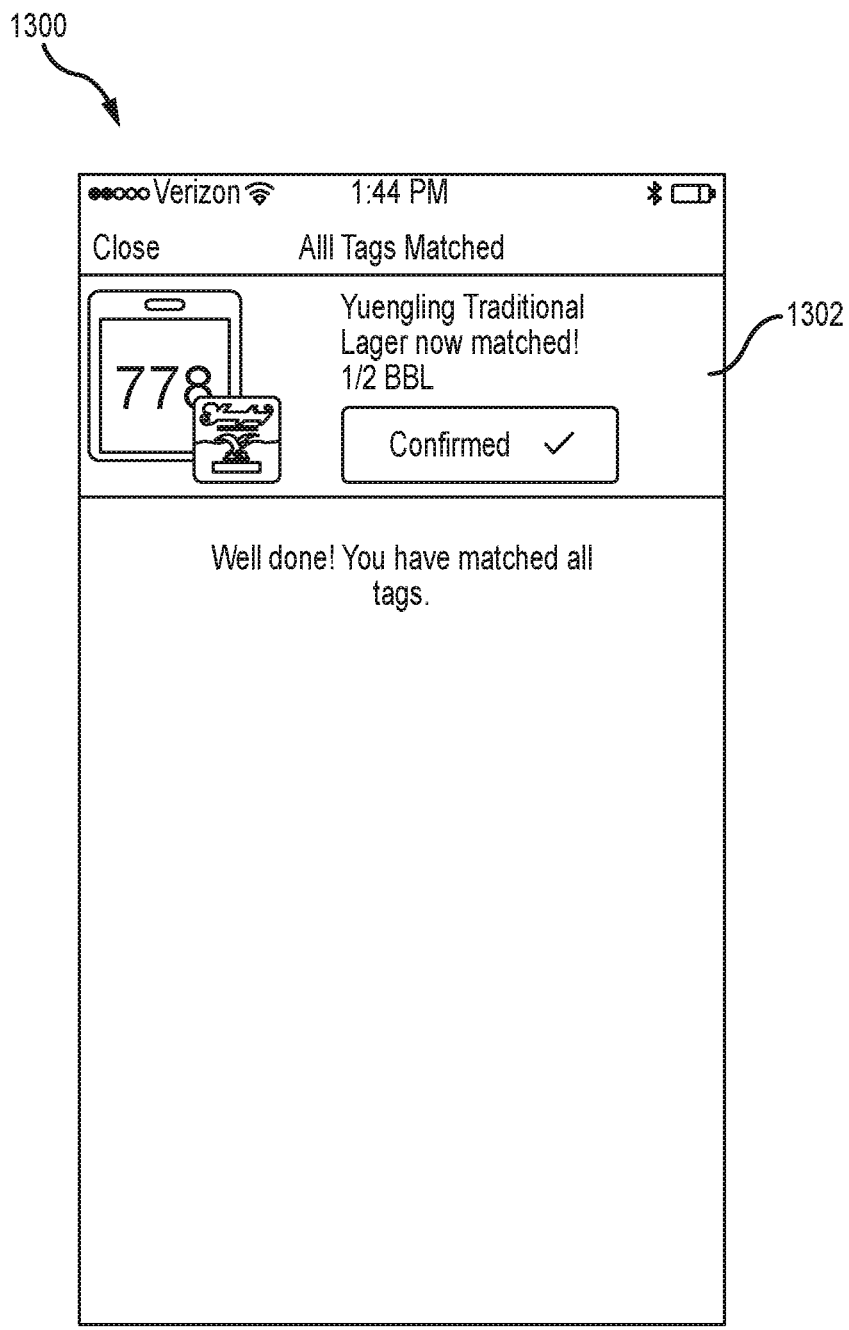
FIG. 13 is a screenshot from a user device display arranged in accordance with examples described herein.

Screenshot 900 of FIG. 9 illustrates a view that may be presented to a user on opening an application on a user device (e.g. Mobile communication device 624) for interacting with containers monitored by sensing devices described herein. The screenshot 900 depicts a listing of containers managed by the user, together with their contents and relative fullness. For example, the entry 906 shows that tag #1 (which may be tap #1 in some examples) is associated with a beer entitled "Floozy . . . " from Black Bottle brewery, and is 82% full. The data displayed in the listing of containers may be obtained from a database including information received from sensing devices described herein, such as from computing system 602 of FIG. 6. The keg icon displayed with each entry may correspond to a size of the container, and the icon may be shaded with a color or other shading indicative of the relative fullness and contents (e.g. color may be selected in accordance with the contents, and fill level may correspond with relative fullness).

The notification 902 may be displayed if a sensing device needs to be matched to a container. For example, the notification 902 may be pushed to the user device in block 806 of FIG. 8. The notification 902 appears as a banner at a top of the inventory listing in the screenshot 900 of FIG. 9. However, other notification formats may be used, including but not limited to, a pop-up, a new page, a separate notification listing in the application, or other indications that a sensing device needs to be paired with a container. The notification 902 simply indicates a number of sensing devices (referred to as 'tags' in the notification 902) which need to be paired to containers, one in the example of the notification 902. A user interface element 904 is provided to allow a user to begin a process of matching the sensing device to a container. The user interface element 904 is implemented as a button for a touchscreen in the screenshot 900, however, other user interface elements may be used. On indicating that the user wishes to begin the matching process (e.g. by clicking or touching or otherwise selecting the user interface element 904), the screenshot 1000 may be displayed.

The screenshot 1000 provides an indication of which sensing device (e.g. using a number, such as a tap number, associated with that sensing device) is in need of matching with a container. For example, the screenshot 1000 shows that there is "unmatched product on tag #778). The icon 1002 may be presented showing a container number in need of matching.

A user may be presented with a listing 1004 of suggested contents of the container to be matched. For example, the listing 1004 provides a listing of beers including "High Esteem" and "Coors Light". Each item in the listing may include a beer name, brewery, alcohol content, brew type, and/or logo associated with the beer name and/or brewery. The suggested contents may be received, for example, in block 808 of FIG. 8. The suggested contents may be based on a variety of factors, including inventory, size, popularity, etc. as described herein.

The user may also be explicitly presented with an option to rematch the container with a recently selected product, through user interface element 1006. The user may also be explicitly presented with an option to search for a size and/or contents of a container to match, through user interface element 1008. The user interface element 1006 and the user interface element 1008 may be implemented, for example, using links that may be touched, clicked, or otherwise selected by a user. Selecting the user interface element 1006 may result in the user being presented with a listing or other display of recently-selected products for matching to the sensing device. Selecting the user interface element 1008, indicating a user would like to search themselves for a product to match, may result in the display shown in screenshot 1100.

The screenshot 1100 indicates a user may be presented with a search box 1102 for entering all or a portion of a name or other product aspect (e.g. brewery, brew type) for searching. In some examples, a search may be made using a user's known inventory, in other examples, a more global listing of content types may be used.

In the example of screenshot 1100, a user has entered "Yuengling" in the search box 1102. Results are shown in results list 1104, and include, for example, "Yuengling Black", "Yuengling Traditional Lager," etc. The results may be ordered by availability in the user's inventory, popularity, or other factors. The results may be provided to the user device, for example in block 808 of FIG. 8.

A user may also select a size of the container to be matched to the sensing device. Suggested sizes may be displayed in the screenshot 1100. For example, suggested size 1106 is shown, together with additional possible sizes. The suggested size may correspond, for example, with a weight of the container as measured by the sensing device. In the example of the screenshot 1100, the suggested size 1106 is a ½ barrel keg.

Selecting "Yuengling Traditional Lager" (e.g. by clicking, touching, or otherwise selecting its listing or a user interface element associated with the listing) may result in the screenshot 1200 being displayed.

The screenshot 1200 includes a confirmation request 1202 to confirm the user's selection of contents to match to the sensing device. The confirmation request 1202 of FIG. 12 requests confirmation to "Match Yuengling Traditional Lager to tag #778" and indicates that the size to be matched is ½ barrel (BBL).

The user's selection of a size (e.g. the suggested size 1106) may be made by touching, clicking, or otherwise selecting the size. In some examples, the suggested size may be selected by default in the absence of a user interaction. The screenshot 1200 includes a confirmation request 1204 confirming the suggested size, for example, by highlighting the suggested size with a box and/or checkmark indicator.

A user may confirm the match by touching, clicking or otherwise selecting a user interface element associated with the confirmation request 1202. On confirmation by the user, the association between the sensing device, tap (e.g. tag) number, and size and contents of the container may be provided to a computing system and stored, for example in block 810 of FIG. 8. On confirming the match, the screenshot 1300 may be displayed.

The screenshot 1300 includes a confirmation notification 1302 indicating that a size and contents of a container have been matched to a sensing device. For example, the confirmation notification 1302 reports "Yuengling Traditional Lager now matched!" and indicates the size is ½. BBL and the tag number is 778. A logo associated with the selected contents may be displayed associated with the tap and/or tag number for ease in confirmation.

Examples of systems described herein may accordingly allow for a computing system to collect data regarding inventory in a collection of containers—e.g. the keg fullness, size, contents, date, time, and/or location data coming from sensing devices positioned to weigh or otherwise determine the relative contents of the containers. Accordingly, a database may be built containing near-real-time inventory levels including type of beer, size of keg, and relative fullness of the keg. This information may be used in a wide variety of ways.

In some examples, computing systems described herein can be set up with individual accounts for each Bar and Restaurant retailer and their various individual establishment locations using the service. A representative of the retailer can set up accounts for each individual in their organization who interacts with keg beer. The setup process can include adding each individual's smart phone/mobile phone number. The representative can set up rules based on their organization's structure and individual needs. One function in the day-to-day operation can be to provide an insight into the current status of their keg beer inventory. The representative can log onto the computing system, then review the current inventory and set rules for alerts based on depletion rates of keg beer. In various embodiments, these alerts can take on the form of SMS texts sent to mobile phones, notifications resident within the application itself or associated, integrated applications, popup push alerts that are part of iPhone, Android and other smart phone formats, emails sent out, recorded voice alerts sent to phones, and other forms. The alerts can be sent to retail workers based on their current location. The system software can take advantage of the location-based service built into each smart phone. The worker may only get alerts if they are in the geographical longitude and latitude area that has already been defined in the database by the recording of the gateway assigned to their place of work. This can assure that workers will not get alerts during their off-shift hours, for example. A manager who would like to get alerts when he is off-site from his retail location can override this function.

In other embodiments, alerts take the form of visual flashing lights and integration into other software in the restaurant including, but not limited to, POS terminals (Point of Sale, electronic "Cash Registers"). The retail representative can assign a value to certain beer brands and types and customize alert based on the value of the beer, that is, the importance of not running out of that beer. For example, the retailer might not value the "Stroh's Light" beer as much as the "Bell's Founder's Ale." So the retailer representative might set up the computing system to automatically alert the designated retailer representative when the Stroh's reaches 10% remaining, while the more valuable Bell's would automatically alert when the remaining beer in the computing system as 40% remaining. In some examples, patterns in the rate of consumption of each product are taken into account, and depletion events are forecasted so that alerts can be raised and orders can be placed "just in time."

When an alert is sent to the retailer, there can be multiple paths e.g., four paths) that they can use to re-order the keg that is running low. If the alert comes to the retailer's phone, they can re-order by sending an SMS text message directly to their beer distributor sales rep, or by sending an SMS text message to an SMS gateway that is controlled by the system vendor and connected by EDI (Electronic Data Interchange) into the beer distributor's ordering system. Another option can be to activate a button in the user interface to initiate a voice call to their beer distributor's sales rep. There can also be iPhone and Android smartphone applications that have a re-ordering function built-in, connecting by EDI to the beer distributor's ordering system. The interface of the smartphone application may have a visual alert with the button option "re-order now," which the retailer can choose.

In some examples, the retailer can set their account to have the computing system automatically submit re-orders on kegs based on rules they set for each brand and type of beer. For example they can set a rule to automatically re-order "Bell's Founder's Ale" if the depletion level has dropped below 40% and the day of the week is Wednesday through Friday.

Retailers can have standard reports accessible to them via the computing system web-based platform or mobile app. These reports can include current and past inventory reports, current and past keg depletion rates, and other reports key to their operation.

Beer distributor sales representatives can see all of their accounts and the current state of each retailer's keg inventory. The sales representative can see when alerts on low kegs were sent out to retailers, who the alert was sent out to, and what action (if any) was taken by the retailer to re-order the depleting, or depleted, keg. The management of the beer distributor can have a near-real-time view of current beer depletion across all of their retail accounts. This near-real-time data can allow them to more efficiently control their inventory of kegs in their warehouse based on trends in usage.

The near-real-time data that the presently disclosed process may be collecting can also be used by breweries to determine what beers are being sold and at what rate. They then can adjust what beers they are planning to brew and in what quantity they brew the beer. In the case of large breweries, they can adjust the purchasing of the ingredients of beer components on the grain futures market. The system vendor can also sell data to marketing data firms who track trends in consumer consumption.

An API (Application Programming Interface) can be developed to allow other applications to access system data for real time software applications.

Figure 14:
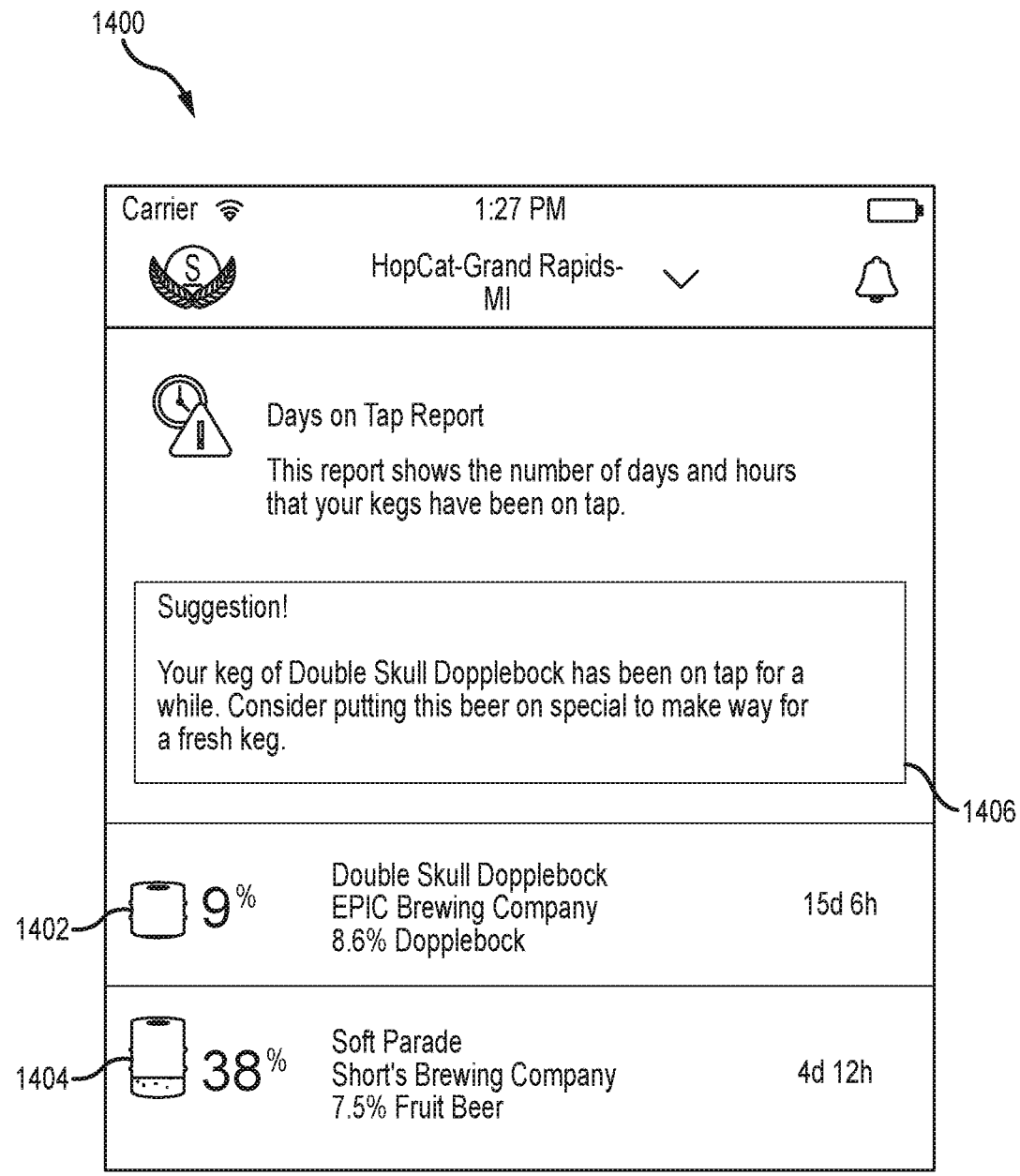
FIG. 14 is an illustration of a display screen providing a report arranged in accordance with examples described herein.

FIG. 14 is an illustration of a display screen providing a report arranged in accordance with examples described herein. The display screen 1400 may be implemented, for example, on a display of the mobile communication device 624 of FIG. 6. The display is showing a "Days on tap report" providing a list of containers at a location and a length of time they have been tapped. The display screen 1400 illustrates two containers—container 1402 and container 1404. Both containers are kegs in the example of FIG. 14. The report displays a relative fullness of each keg, obtained in accordance with data received from sensing devices associated with the kegs. The container 1402 is 9% full and the container 1404 is 38% full. The display screen 1400 further provides the contents of each of the containers. The container 1402 contains Double Skull Doppelback from EPIC Brewing Company, which is an 8.6% alcohol content Doppelback. The container 1404 contains Soft Parade form Short's Brewing Company, which is a 7.5% alcohol content fruit beer. The length of time each container has been tapped is also shown. The container 1402 has been tapped for 15 days and 6 hours. The container 1404 has been tapped for 4 days and 12 hours. The length of time is based on a time elapsed since a first weight reading for the container was received from an associated sensing device. The display screen 1400 further illustrates a logo providing a graphical illustration of a size and a relative fullness of each container.

Recommendations may be displayed on the display screen 1400. For example, the recommendation 1406 is shown—to consider putting the Double Skull Doppelback on special because it has been on tap greater than a threshold time.

The executable instructions for sensor management encoded on the computer readable media 608 of FIG. 6 may include instructions for providing reports, including the days on tap report shown in FIG. 14. The data used to generate the report may be stored in the memory 606 and/or other memory accessible to the computing system 602. In some examples, the mobile communication device 624 of FIG. 6 may be programmed to provide reports, such as the days on tap report shown in FIG. 14.

FIG. 15 is a display image of a digital display of a menu arranged in accordance with examples described herein. Data collected using sensing devices described herein may be used to provide digital signs, including menus and/or listings of available liquids.

The menu 1500 lists the contents of ten taps available at an establishment. The contents are listed including beer name, brewery name, alcohol content, and beer type. An icon is provided by each listed contents illustrating a type, size, and relative fullness of the container. Different icons may be used for different keg types, and the keg may be depicted at a fullness level in accordance with a fullness of the keg, as indicated by a transmission from one or more sensing devices described herein. In some examples, a color of the icon (e.g. a color of the liquid shown filling the keg to a fullness level in each icon) may be selected in accordance with the type of beer (e.g. a lighter brown for pilsner, reddish brown for amber, dark brown for stout). The menu 1500 further includes pricing information for various sizes available for purchase at the establishment.

In this manner, a menu may be dynamically updated using data received from one or more sensing devices described herein, e.g. data in the memory 606 or other storage devices of FIG. 6.

The menu 1500 may be displayed on any display device including, but not limited to, a television, monitor, LCD or LED display, touchscreen, tabletop display, projected display, or augmented or virtual reality display. In some examples, Google ChromeCast or similar devices may be used to display data (e.g. Menu 1500) from one or more other devices (e.g. Computing system 602 and/or mobile communication device 624 of FIG. 6) onto a connected display screen. The data on the menu 1500 may be dynamically updated in accordance with information received from sensing devices in systems described herein. For example, if a container is changed and a new container paired with a sensing device, the previous product may cease to be displayed on the menu 1500 and the size and contents of the next container may be displayed on the menu 1500 in its place.

From the foregoing it will be appreciated that, although specific embodiments of the invention have been described herein for purposes of illustration, various modifications may be made without deviating from the spirit and scope of the invention.

What is claimed is:

1. A method comprising:
   pairing an identification device and a tap number, wherein the pairing comprises encoding the identification device with the tap number;
   reading, with a sensing device, the tap number encoded at the identification device;
   associating the tap number with the sensing device;
   receiving a notification, at a user device, that a first container monitored by the sensing device positioned under the first container has been replaced by a second container;
   receiving, at the user device, an indication of a size and contents of the second container;

displaying, at the user device, suggested sizes and contents of the second container to associate the second container with the sensing device;

matching, at the user device, one of the suggested sizes and contents of the second container to the tap number, thereby associating the second container with the sensing device; and transmitting the indication of the size and contents of the second container to a computing system, wherein the computing system is configured to associate the size and contents of the second container with the sensing device and the tap number.

2. The method of claim 1 wherein the first container and the second container are kegs.

3. The method of claim 1 wherein the sensing device is configured to periodically transmit an ID of the sensing device and an indication of a weight of the second container.

4. The method of claim 3 wherein the computing system is configured to associate the size and contents of the second container with the II) of the sensing device.

5. The method of claim 1 wherein the notification is received responsive to a weight of the first container falling below a first threshold and a weight of the second container being above a second threshold.

6. The method of claim 1 wherein the user device is a mobile communication device.

7. The method of claim 1 further comprising:
providing, by the user device, the suggested sizes and contents of the second container based, at least in part, on a weight of the second container.

8. The method of claim 7 wherein the suggested sizes and contents of the second container are based, at least in part, on an inventory at a location housing the second container.

9. The method of claim 7 wherein the suggested sizes and contents of the second container are displayed in an order based, at least in part, on popularity of certain contents in a region including a location housing the second container.

10. The method of claim 1, wherein the identification device is an MD tag.

11. The method of claim 1, wherein displaying, at the user device, the suggested sizes and contents of the second container to associate the second container with the sensing device comprises displaying a listing of recently-selected containers as the suggested sizes and contents of the second container; and wherein matching, at the user device, one of the suggested sizes and contents of the second container to the tap number comprises rematching one of the recently-selected containers as the one of the suggested sizes and contents of the second container to the tap number.

12. The method of claim 1, wherein matching, at the user device, the one suggested size and content of the second container to the tap number comprises utilizing a default suggested size as the one suggested size of the second container, wherein the default suggested size is utilized in the absence of a user interaction at the user device.

13. A computing system comprising:
one or more processing units;
memory accessible to the one or more processing units, the memory configured to store associations between sensing devices and sizes and contents of containers positioned above the sensing devices;
at least one non-transitory computer readable medium encoded with instructions, which when executed by the one or more processing units cause the computing system to perform actions, the actions including:
pairing identification devices with port numbers, wherein the pairing comprises encoding each identification device with a corresponding port number;
reading, with at least one of the sensing devices, at least one port number encoded at the identification device associated with the at least one sensing device;
associating the at least one port number with the at least one sensing device;
receiving periodic transmissions from the at least one sensing device, the periodic transmissions including an ID of the at least one sensing device and an indication of a weight of a container positioned above the at least one sensing device;
responsive to a transmission from the at least one sensing device indicative of a weight below a first threshold and a subsequent transmission from the at least one sensing device indicative of a weight above a second threshold, transmitting a notification to a user device that the container has been replaced with a next container;
receiving, from the user device, an indication of a size and contents of the next container;
displaying, at the user device, suggested sizes and contents of the next container to associate the next container with the at least one sensing device;
matching, at the user device, one of the suggested sizes and contents of the next container to the tap number, thereby associating the next container with the at least one sensing device; and
updating the memory to associate the at least one sensing device and the port number with the size and contents of the next container.

14. The computing system of claim 13 wherein the container and the next container comprise kegs.

15. The computing system of claim 13 wherein the indication of the size and contents of the container comprise a type of beer in the container.

16. The computing system of claim 13, the actions further including:
associating a location with the sensing device based on the ID of the sensing device and a gateway from which the periodic transmissions were received.

17. The computing system of claim 16, the actions further including:
transmitting indications of available inventory at the location to the user device; and
wherein the indication of the size and contents of the next container comprises a selection from the indications of available inventory.

18. The computing system of claim 16, the actions further including:
transmitting the suggested sizes and contents of the next container to the user device, wherein the suggested sizes and contents are based, at least in part, on consumption data in a region including the location.

19. The computing system of claim 13, the actions further including:
transmitting the suggested sizes and contents of the next container to the user device, wherein the suggested sizes and contents are based, at least in part, on the periodic transmissions from the sensing device.

20. The computing system of claim 13, wherein the container comprises a keg and wherein the sensing device is positioned beneath the keg and configured to weigh the keg.

21. The computing system of claim 13, the actions further including:
  transmitting an indication of the contents and level of the container to a display device.

22. The computing system of claim 13, wherein the sensing device comprises an ID device reader configured to receive data from the identification device.

\* \* \* \* \*

UNITED STATES PATENT AND TRADEMARK OFFICE
CERTIFICATE OF CORRECTION

PATENT NO. : 10,578,475 B2
APPLICATION NO. : 15/142942
DATED : March 3, 2020
INVENTOR(S) : Michael Flockenhaus et al.

Page 1 of 1

It is certified that error appears in the above-identified patent and that said Letters Patent is hereby corrected as shown below:

In the Claims

Column 23 Line 41:
In the second line of Claim 10, please delete "MD" and insert in lieu thereof --RFID--.

Signed and Sealed this
Fourteenth Day of July, 2020

Andrei Iancu
*Director of the United States Patent and Trademark Office*